US010198634B2

United States Patent
Zhou et al.

(10) Patent No.: US 10,198,634 B2
(45) Date of Patent: Feb. 5, 2019

(54) SYSTEMS AND METHODS FOR DETECTING AND TRACKING MOVABLE OBJECTS

(71) Applicant: SZ DJI TECHNOLOGY Co., Ltd, Shenzhen (CN)

(72) Inventors: You Zhou, Shenzhen (CN); Cong Zhao, Shenzhen (CN); Ketan Tang, Shenzhen (CN); Jiaqi Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/366,857

(22) Filed: Dec. 1, 2016

(65) Prior Publication Data

US 2017/0083748 A1 Mar. 23, 2017

Related U.S. Application Data

(63) Continuation of application No. PCT/CN2015/089464, filed on Sep. 11, 2015.

(51) Int. Cl.
*G06K 9/00* (2006.01)
*G06K 9/62* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC ............ G06K 9/0063; G06K 9/00771; G06K 9/4604; G06K 9/4671; G06K 9/6228;
(Continued)

(56) References Cited

U.S. PATENT DOCUMENTS

| 4,924,507 A | 5/1990 | Chao et al. |
| 5,047,995 A | 9/1991 | Wells |

(Continued)

FOREIGN PATENT DOCUMENTS

| CN | 102355574 A | 2/2012 |
| CN | 103149939 A | 6/2013 |

(Continued)

OTHER PUBLICATIONS

Lin, Feng, Dong, Xiangxu, Chen, Ben M., Lum, Kai-Yew, Lee, Tong H. "A Robust Real-Time Embedded Vision System on an Unmanned Rotorcraft for Ground Target Following" IEEE Transactions on Industrial Electronics 2012.*

(Continued)

*Primary Examiner* — Kim Y Vu
*Assistant Examiner* — Molly Delaney
(74) *Attorney, Agent, or Firm* — Anova Law Group, PLLC

(57) ABSTRACT

Systems, methods, and devices are provided herein for detecting and tracking one or more movable objects. A method for supporting visual tracking may be provided. The method may comprise: receiving a plurality of image frames captured at different times using an imaging device, wherein each image frame comprises a plurality of pixels that are associated with a plurality of feature points; analyzing the plurality of image frames to compute movement characteristics of the plurality of feature points; and identifying at least one tracking feature relative to at least one background feature based on the movement characteristics of the plurality of feature points.

18 Claims, 30 Drawing Sheets

(51) Int. Cl.
|  |  |
|---|---|
| *B64D 47/08* | (2006.01) |
| *B64C 39/02* | (2006.01) |
| *G06K 9/46* | (2006.01) |
| *G06T 7/215* | (2017.01) |
| *G06T 7/246* | (2017.01) |
| *G01S 5/02* | (2010.01) |
| *H04N 5/232* | (2006.01) |
| *H04N 5/33* | (2006.01) |

(52) U.S. Cl.
CPC ............ *G01S 5/02* (2013.01); *G06K 9/00771* (2013.01); *G06K 9/4604* (2013.01); *G06K 9/4671* (2013.01); *G06K 9/6228* (2013.01); *G06T 7/215* (2017.01); *G06T 7/248* (2017.01); *H04N 5/232* (2013.01); *H04N 5/33* (2013.01); *B64C 2201/123* (2013.01); *B64C 2201/127* (2013.01); *B64C 2201/145* (2013.01); *G06T 2207/10032* (2013.01); *G06T 2207/30232* (2013.01)

(58) Field of Classification Search
CPC ......... G06T 7/215; G06T 7/194; G06T 7/246; G06T 7/248; G06T 7/2033; G06T 7/0028
See application file for complete search history.

(56) References Cited

U.S. PATENT DOCUMENTS

| | | | |
|---|---|---|---|
| 6,837,432 | B2 | 1/2005 | Tsikos et al. |
| 7,251,346 | B2 | 7/2007 | Higaki et al. |
| 7,289,227 | B2 | 10/2007 | Smetak et al. |
| 7,686,252 | B2 | 3/2010 | Mickley et al. |
| 7,741,990 | B2 | 6/2010 | Aprile |
| 8,363,900 | B2 | 1/2013 | Huang |
| 8,791,901 | B2 | 7/2014 | Mallinson |
| 9,014,426 | B2 | 4/2015 | Leuck et al. |
| 9,020,261 | B2 | 4/2015 | Lipton et al. |
| 9,852,513 | B2 * | 12/2017 | Wu .................. G06T 7/215 |
| 2006/0067562 | A1 * | 3/2006 | Kamath ............ G06T 7/254 382/103 |
| 2007/0155502 | A1 | 7/2007 | Wu |
| 2011/0228979 | A1 * | 9/2011 | Nishino ............ G06T 7/246 382/103 |
| 2013/0093866 | A1 | 4/2013 | Ohlhues et al. |
| 2013/0108109 | A1 * | 5/2013 | Leuck .............. G06T 7/254 382/103 |
| 2013/0265439 | A1 * | 10/2013 | Jin ................. H04N 5/232 348/169 |
| 2014/0226858 | A1 | 8/2014 | Kang et al. |
| 2014/0355829 | A1 | 12/2014 | Heu et al. |
| 2016/0093101 | A1 * | 3/2016 | Benedek ........ G06K 9/00201 345/420 |

FOREIGN PATENT DOCUMENTS

| | | |
|---|---|---|
| CN | 103413441 A | 11/2013 |
| CN | 103794087 A | 5/2014 |
| CN | 104777847 A | 7/2015 |
| EP | 0789342 A1 | 8/1997 |
| EP | 2056059 A1 | 5/2009 |
| EP | 2701093 A1 | 2/2014 |
| GB | 2520243 A | 5/2015 |
| JP | 2001357385 A | 12/2001 |
| JP | 2006146551 A | 6/2006 |
| JP | 2009173263 A | 8/2009 |
| JP | 2009294842 A | 12/2009 |
| JP | 2014174646 A | 9/2014 |
| WO | 2014169354 A1 | 10/2014 |

OTHER PUBLICATIONS

Yasuyuki Sugaya and Kenichi Kanatani, Automatic camera model selection for multibody motion segmentation, Department of Information Technology Research Report, Okayama University, Sep. 12, 2002, pp. 9-6, Japan.

Barron et al., Tutorial: Computing 2D and 3D Optical Flow, Tina Memo 2004-012.

Duraiswami,. "Object Recognition". 2000. Presentation.

Kondermann, et al . On performance analysis of optical flow algorithms. In Proceedings of the 15th international conference on Theoretical Foundations of Computer Vision: outdoor and large-scale real-world scene analysis, Frank Dellaert, Jan-Michael Frahm, Marc Pollefeys, Laura Leal-Taixé, and Bodo Rosenhahn (Eds.). Springer-Verlag, Berlin, Heidelberg, 329-355. DOI=http://dx.doi.org/10.1007/978-3-642-34091-8_15.

Martinez, Image Processing: 4. Optical Flow. Presentation.

Sun et al., Secrets of optical flow estimation and their principles. IEEE Conf. on Computer Vision and Pattern Recog., CVPR, Jun. 2010.

The World Intellectual Property Organization (WIPO) International Search Report for PCT/CN2015/089464, dated Jun. 7, 2016 7 Pages.

Sadeghi-Tehran Pouria et al., A Real-time Approach for Autonomous Detection and Tracking of Moving Objects from UAV, 2014 IEEE Symposium on Evolving and Autonomous Learning Systems (EALS), IEEE Dec. 9, 2014, pp. 43-49.

Heisele et al., Obstacle Detection Based on Color Blob Flow, Intelligent Vehicles '95 Symposium, Proceedings of the Detroit, MI, USA, Sep. 25, 1995, pp. 282-286, IEEE, US.

Andrea Giachetti et al., The Use of Optical Flow for Road Navigation, IEEE Transactions on Robotics and Automation, vol. 14, No. 1, Feb. 1, 1998, pp. 34-48.

* cited by examiner

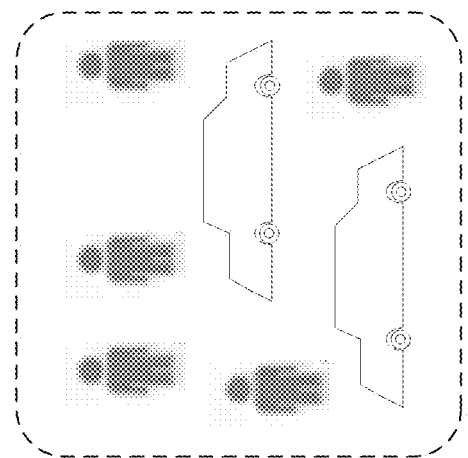
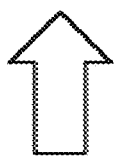
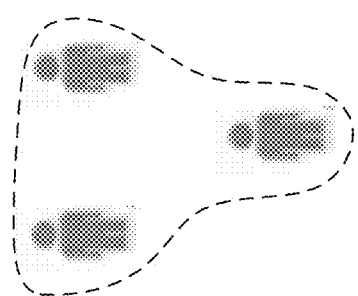
FIG. 8

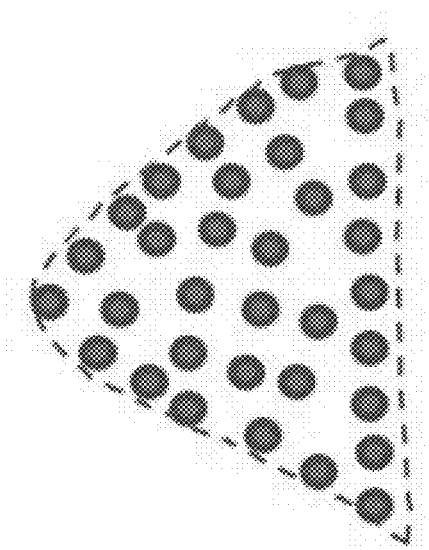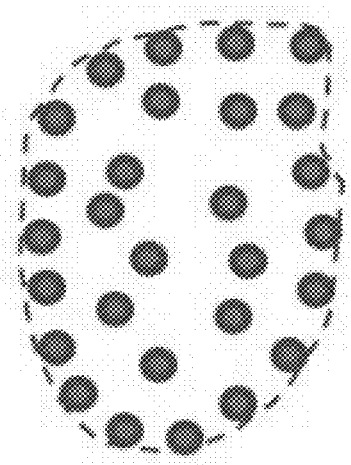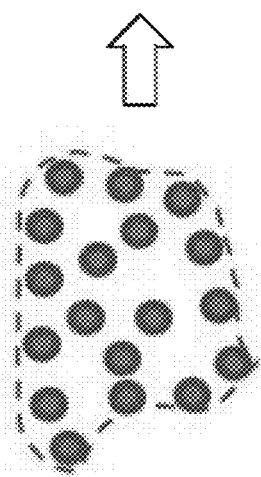
FIG. 9

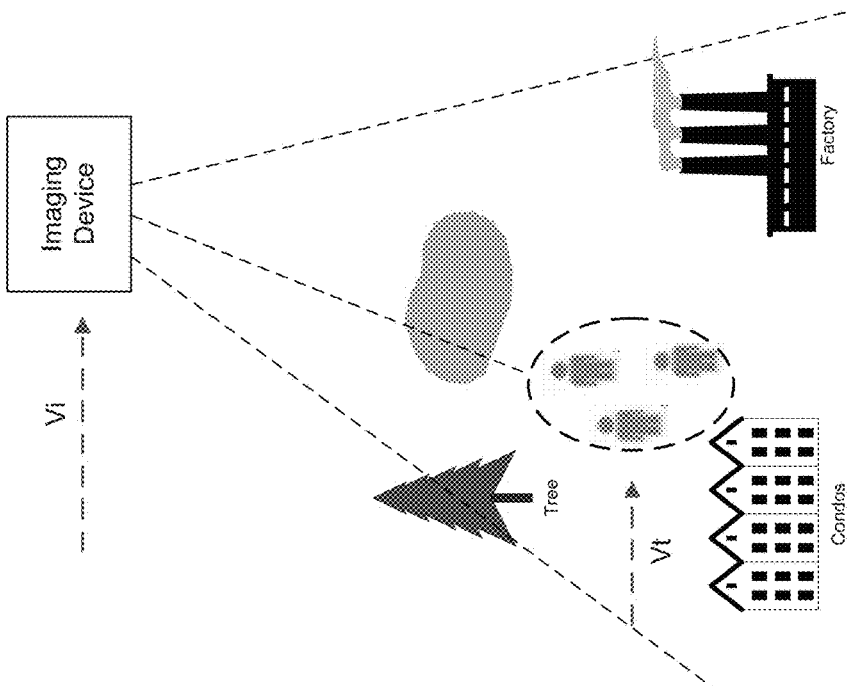
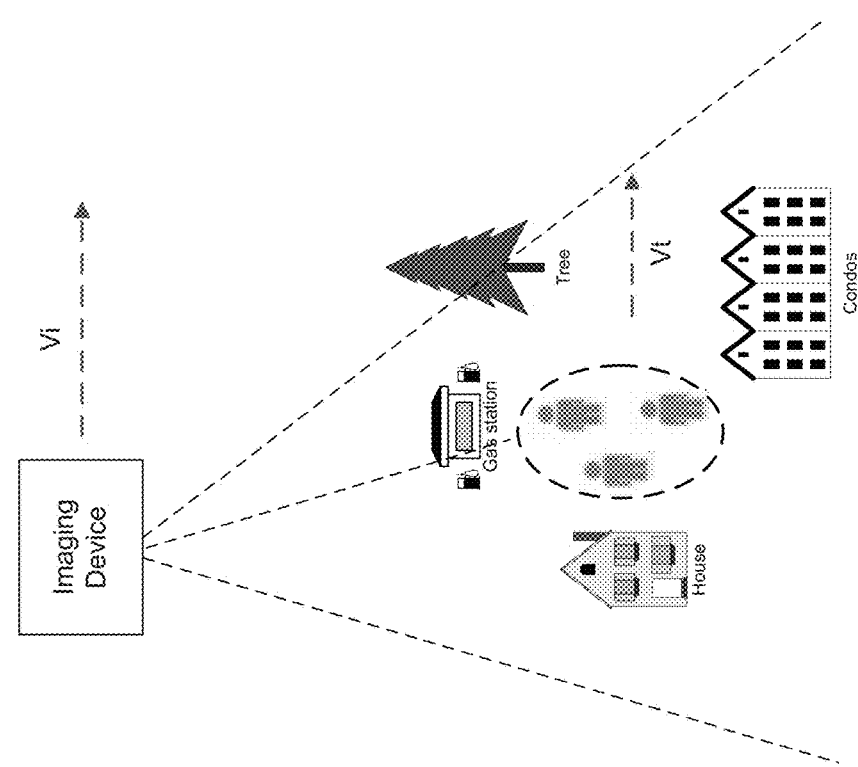
FIG. 19

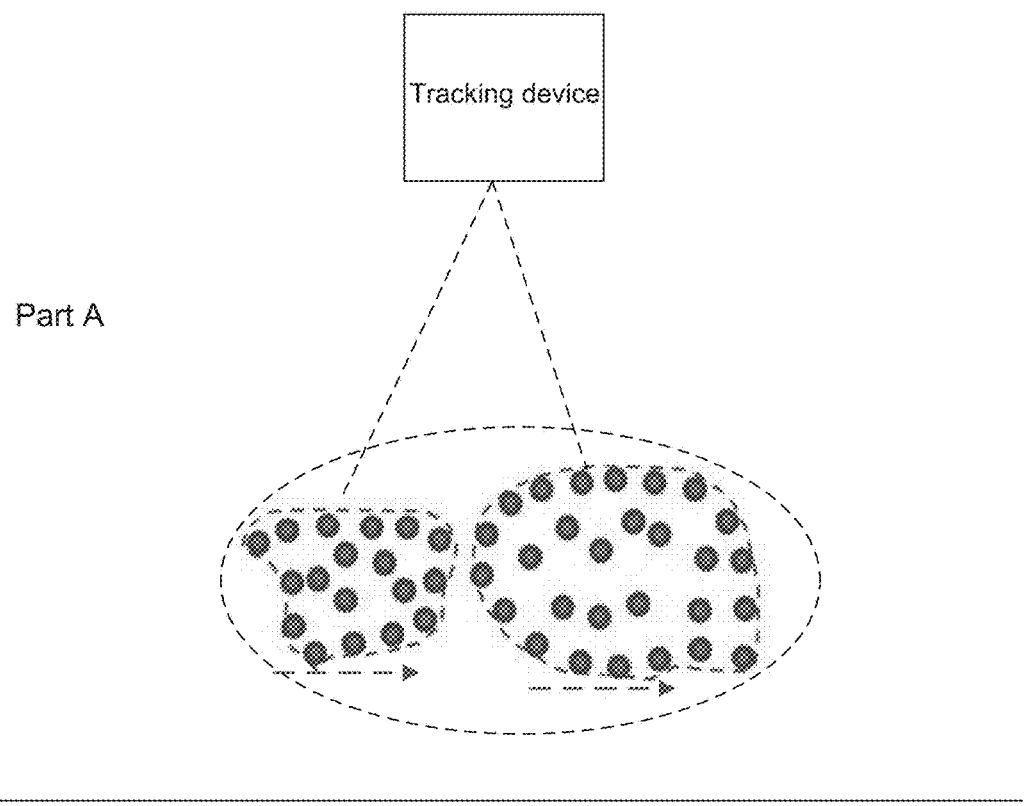
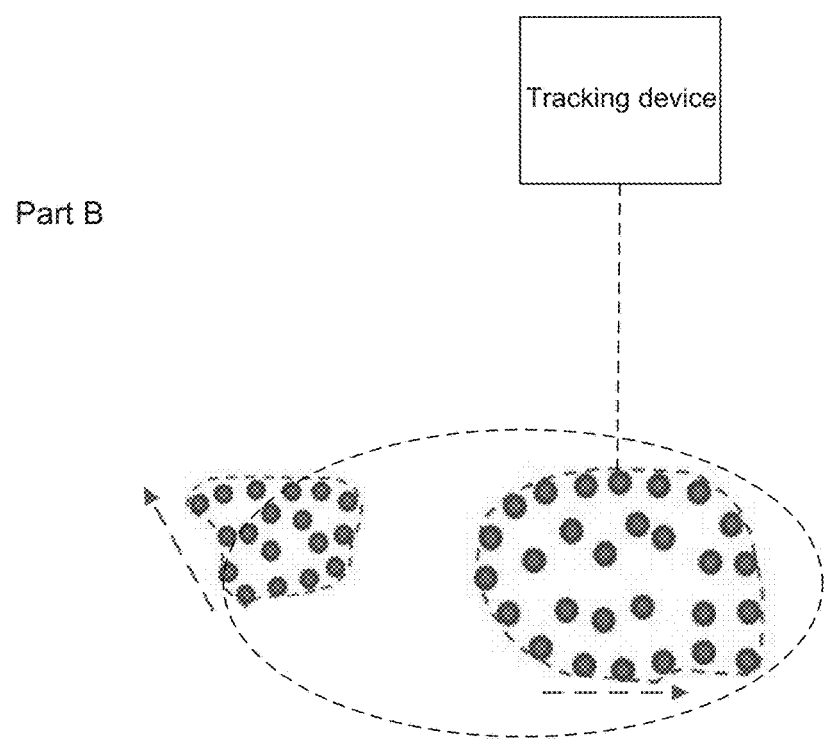
FIG. 29

SYSTEMS AND METHODS FOR DETECTING AND TRACKING MOVABLE OBJECTS

CROSS-REFERENCE

This application is a continuation of International Application No. PCT/CN2015/089464, filed on Sep. 11, 2015. The above-referenced application is hereby incorporated by reference.

BACKGROUND

In some surveillance, reconnaissance, and exploration tasks for real-world applications, one or more objects may need to be detected and tracked. Conventional tracking methods may be based on global positioning system (GPS) data or camera vision. However, conventional GPS-based or vision-based tracking methods may be inadequate for certain applications. For example, conventional GPS-based tracking methods may not be useful in places with poor GPS signal reception or if the tracked objects do not have GPS receivers located on them. Conventional vision-based tracking methods may lack the capability for precisely tracking a group of moving objects. An aerial vehicle carrying a payload (e.g., a camera) can be used to track objects. In some cases, one or more operators may have to manually select the moving objects to be tracked, and manually control the aerial vehicle/camera to track the moving objects. This limited tracking ability may reduce the usefulness of aerial vehicles in certain applications.

SUMMARY

A need exists to improve conventional tracking methods such as vision-based tracking methods. The improved tracking capabilities may allow an imaging device to automatically detect one or more moving objects and to autonomously track the moving objects, without requiring manual input and/or operation by a user. The improved tracking capabilities may be particularly useful when the imaging device is used to precisely track a fast-moving group of objects, whereby the size and/or shape of the group may be amorphous and change over time as the objects move. The improved tracking capabilities can be incorporated into an aerial vehicle, such as an unmanned aerial vehicle (UAV).

In vision-based tracking methods, a target object may be tracked using an imaging device located on an aerial vehicle. Conventional vision-based tracking methods can be manual or automatic.

For example, in a vision-based manual tracking method, an image may be first captured using the imaging device, and an operator may manually select a target object to be tracked from the image. The manual selection may be performed using an input device, for example, a tablet, a mobile device, or a personal computer (PC). In some instances, the aerial vehicle may be configured to automatically track the target object after it has been manually selected by the operator using the input device. In other instances, the operator may continue to manually control the aerial vehicle to track the target object even after it has been selected.

Conversely, in a vision-based automatic tracking method, automatic tracking may be implemented using tracking algorithms that can automatically detect a particular type of object, or an object carrying a marker. The type of object may be based on different object classes (e.g., people, buildings, landscape, etc.). The marker may include one or more optical markers comprising unique patterns.

In conventional vision-based tracking methods, a target object may be defined based on predetermined features (e.g., color, structure, salient features, etc.) and/or by modeling (e.g., object class). After the target object has been defined, movement of the features and/or model may be detected and calculated in real-time as the target object moves. In these methods, a high-level consistency in the features and/or model may be typically required for precise tracking of the target object. In particular, the level of tracking precision may depend on the spatial relations between the features and/or an error in the model.

Although conventional vision-based tracking methods can be used to track a single object, they may be inadequate for tracking a group of moving objects. In particular, conventional vision-based tracking methods may lack the capability to precisely track a fast-moving group of objects, whereby the size and/or shape of the group may be amorphous and change over time as the objects move. Examples of such groups of objects may include, but are not limited to, groups of moving animals (e.g., a herd of horses running on the plains, or a flock of birds flying in different formations), groups of people (e.g., a large crowd of people moving in a parade), groups of vehicles (e.g., a squadron of airplanes performing aerial acrobatics), or groups comprising different objects moving in different formations (e.g., a group comprising of moving animals, people, and vehicles to be tracked).

In a conventional global positioning system (GPS)-based tracking method, an imaging device and a target object may each be provided with GPS apparatus (e.g., a GPS receiver). A spatial relation between the imaging device and the target object may be calculated based on estimates of their real-time locations. The imaging device may be configured to track the target object based on their spatial relation. However, this method may be limited by GPS signal quality and availability of GPS signals. For example, conventional global positioning system (GPS)-based tracking methods may not work indoors, or when GPS signal reception is blocked by buildings and/or natural terrain features such as valleys, mountains, etc. Furthermore, these methods are predicated on GPS tracking, and thus cannot be used when the target object(s) (e.g., a group of animals) do not carry GPS apparatus.

In addition, the tracking accuracy in conventional GPS-based tracking methods may be limited, given that the location accuracy of a typical GPS receiver ranges from about 2 meters to about 4 meters. In some instances, an aerial vehicle and a target object may be moving concurrently. However, their estimated positions and velocities from GPS signals may not be updated at a sufficient frequency in real-time that allows for high precision tracking. For example, there may be a time delay or a lack of correlation between the estimated positions and velocities of the UAV and the target object. This may compound the inherent GPS positioning errors (2~4 m) of the UAV and target object, and result in a further decrease in tracking precision/accuracy.

Accordingly, a need exists to improve the tracking capabilities and robustness of an aerial vehicle under different conditions for a variety of applications requiring high accuracy/precision. The conditions may include both indoor and outdoor environments, places without GPS signals or places that have poor GPS signal reception, a variety of different terrain, etc. The applications may include precise tracking of a moving target object and/or a group of moving target objects. The target objects may include target objects that do not carry GPS apparatus, target objects that do not have well-defined features or that do not fall into known object classes, target objects that collectively form a group whereby the size and/or shape of the group may be amorphous and change over time, a plurality of different target objects moving in different formations, or any combination of the above. Systems, methods, and devices are provided herein to address at least the above needs.

For instance, in some aspects of the invention, a method for supporting visual tracking is provided. The method may comprise: receiving a plurality of image frames captured at different times using an imaging device, wherein each image frame comprises a plurality of pixels that are associated with a plurality of feature points; analyzing the plurality of image frames to compute movement characteristics of the plurality of feature points; and identifying at least one tracking feature relative to at least one background feature based on the movement characteristics of the plurality of feature points.

According to an aspect of the invention, an apparatus for supporting visual tracking is provided. The apparatus may comprise one or more processors that are, individually or collectively, configured to: receive a plurality of image frames captured at different times using an imaging device, wherein each image frame comprises a plurality of pixels that are associated with a plurality of feature points; analyze the plurality of image frames to compute movement characteristics of the plurality of feature points; and identify at least one tracking feature relative to at least one background feature based on the movement characteristics of the plurality of feature points.

According to another aspect of the invention, a non-transitory computer-readable medium storing instructions that, when executed, causes a computer to perform a method for supporting visual tracking, is provided. The method may comprise: receiving a plurality of image frames captured at different times using an imaging device, wherein each image frame comprises a plurality of pixels that are associated with a plurality of feature points; analyzing the plurality of image frames to compute movement characteristics of the plurality of feature points; and identifying at least one tracking feature relative to at least one background feature based on the movement characteristics of the plurality of feature points.

A visual tracking system may be provided in accordance with an additional aspect of the invention. The system may comprise: an imaging device, and one or more processors that are, individually or collectively, configured to: receive a plurality of image frames captured at different times using the imaging device, wherein each image frame comprises a plurality of pixels that are associated with a plurality of feature points; analyze the plurality of image frames to compute movement characteristics of the plurality of feature points; and identify at least one tracking feature relative to at least one background feature based on the movement characteristics of the plurality of feature points.

Further aspects of the invention may be directed to a method for supporting visual tracking. The method may comprise: receiving a plurality of image signals, which are indicative of a plurality of image frames captured by an imaging device over a period of time while the imaging device is in motion, wherein each image frame comprises a plurality of pixels; obtaining motion characteristics of the imaging device based on a plurality of motion signals; and analyzing the plurality of image signals based on the motion characteristics of the imaging device, so as to compute movement characteristics associated with the plurality of pixels.

According to an aspect of the invention, an apparatus for supporting visual tracking is provided. The apparatus may comprise one or more processors that are, individually or collectively, configured to: receive a plurality of image signals, which are indicative of a plurality of image frames captured by an imaging device over a period of time while the imaging device is in motion, wherein each image frame comprises a plurality of pixels; obtain motion characteristics of the imaging device based on a plurality of motion signals; and analyze the plurality of image signals based on the motion characteristics of the imaging device, so as to compute movement characteristics associated with the plurality of pixels.

According to another aspect of the invention, a non-transitory computer-readable medium storing instructions that, when executed, causes a computer to perform a method for supporting visual tracking, is provided. The method may comprise: receiving a plurality of image signals, which are indicative of a plurality of image frames captured by an imaging device over a period of time while the imaging device is in motion, wherein each image frame comprises a plurality of pixels; obtaining motion characteristics of the imaging device based on a plurality of motion signals; and analyzing the plurality of image signals based on the motion characteristics of the imaging device, so as to compute movement characteristics associated with the plurality of pixels.

An unmanned aerial vehicle (UAV) may be provided in accordance with an additional aspect of the invention. The UAV may comprise: a visual tracking system comprising an imaging device, and one or more processors that are, individually or collectively, configured to: receive a plurality of image signals, which are indicative of a plurality of image frames captured by the imaging device over a period of time while the imaging device is in motion, wherein each image frame comprises a plurality of pixels; obtain motion characteristics of the imaging device based on a plurality of motion signals; and analyze the plurality of image signals based on the motion characteristics of the imaging device, so as to compute movement characteristics associated with the plurality of pixels.

Further aspects of the invention may be directed to a method for supporting visual tracking. The method may comprise: obtaining, via a mobile visual tracking device, movement characteristics of a plurality of feature points; selecting a group of feature points from the plurality of feature points based on the movement characteristics of the plurality of feature points; and tracking the group of feature points by adjusting motion characteristics of the mobile visual tracking device, so as to substantially position the group of feature points in a target region of each image frame captured using the mobile visual tracking device.

According to an aspect of the invention, an apparatus for supporting visual tracking is provided. The apparatus may comprise one or more processors that are, individually or collectively, configured to: obtain, via a mobile visual tracking device, movement characteristics of a plurality of feature points; select a group of feature points from the plurality of feature points based on the movement characteristics of the plurality of feature points; and track the group of feature points by adjusting motion characteristics of the mobile visual tracking device, so as to substantially position the group of feature points in a target region of each image frame captured using the mobile visual tracking device.

According to another aspect of the invention, a non-transitory computer-readable medium storing instructions that, when executed, causes a computer to perform a method for supporting visual tracking is provided. The method may comprise: obtaining, via a mobile visual tracking device, movement characteristics of a plurality of feature points; selecting a group of feature points from the plurality of feature points based on the movement characteristics of the plurality of feature points; and tracking the group of feature points by adjusting motion characteristics of the mobile visual tracking device, so as to substantially position the group of feature points in a target region of each image frame captured using the mobile visual tracking device.

An unmanned aerial vehicle (UAV) may be provided in accordance with an additional aspect of the invention. The UAV may comprise: a visual tracking system comprising an imaging device, and one or more processors that are, individually or collectively, configured to: obtain, via a mobile visual tracking device, movement characteristics of a plurality of feature points; select a group of feature points from the plurality of feature points based on the movement characteristics of the plurality of feature points; and track the group of feature points by adjusting motion characteristics of the mobile visual tracking device, so as to substantially position the group of feature points in a target region of each image frame captured using the mobile visual tracking device.

It shall be understood that different aspects of the invention can be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 illustrates a change in size and/or shape of a contour surrounding a tracking feature with the movement, convergence, divergence, addition, and/or subtraction of one or more target objects of different object classes, in accordance with some embodiments;

FIG. 9 illustrates a change in size and/or shape of a contour surrounding a tracking feature as the number of target objects changes, or when the target objects move collectively in a random manner, in accordance with some embodiments;

FIGS. 17, 18, and 19 illustrate different embodiments in which an imaging device is tracking a group of target objects, in accordance with some embodiments;

FIG. 29 illustrates the tracking of subsets of feature points using the mobile visual tracking system of FIG. 26, in accordance with some embodiments.

DETAILED DESCRIPTION

Figure 1:
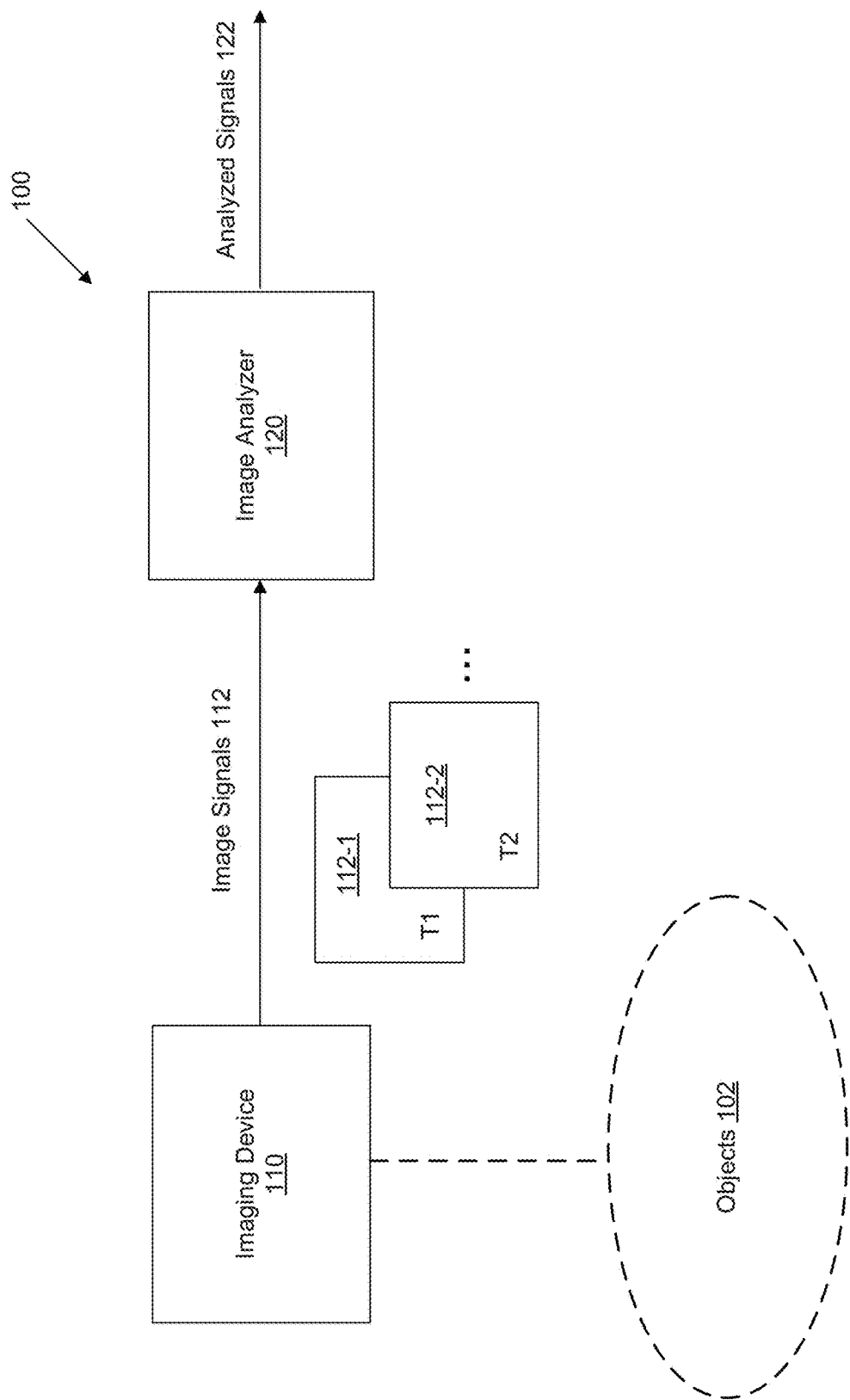
FIG. 1 illustrates a block diagram of a visual tracking system comprising an exemplary image analyzer, in accordance with some embodiments.

Systems, methods, and devices provided herein permit a moving object or a group of moving objects to be identified and/or tracked with high precision and/or accuracy. This can improve the identification and/or tracking capabilities of a tracking device. In some instances, the systems, methods, and devices provided herein can identify particular visual features in a plurality of image frames regardless whether those particular visual features are tracked.

In some embodiments, a plurality of image frames may be captured at different times using an imaging device. Each image frame may comprise a plurality of pixels that are associated with a plurality of feature points. The plurality of image frames may be analyzed to compute movement characteristics of the plurality of feature points. At least one tracking feature relative to at least one background feature may be identified based on the movement characteristics of the plurality of feature points. The tracking feature may be associated with one or more moving objects, and the background feature may be associated with one or more stationary objects. Accordingly, the moving objects and the stationary objects may be identified by distinguishing the tracking feature from the background feature.

In some other embodiments, one or more moving objects can be tracked while the imaging device is in motion. In those embodiments, a plurality of image signals may be received. The image signals may be indicative of a plurality of image frames captured by the imaging device over a period of time while the imaging device is in motion. Each image frame may comprise a plurality of pixels. Motion characteristics of the imaging device may be obtained based on a plurality of motion signals associated with the imaging device. The plurality of image signals may be analyzed based on the motion characteristics of the imaging device, so as to compute movement characteristics associated with the plurality of pixels. In some instances, a correlation between the movement characteristics associated with the plurality of pixels and the motion characteristics of the imaging device may be obtained.

In some further embodiments, one or more moving objects can be tracked by adjusting motion characteristics of a mobile visual tracking device. In those embodiments, movement characteristics of a plurality of feature points may be obtained via a mobile visual tracking device. A group of feature points from the plurality of feature points may be selected based on the movement characteristics of the plurality of feature points. The group of feature points may be associated with the one or more moving objects. The group of feature points may be tracked by adjusting motion characteristics of the mobile visual tracking device, so as to substantially position the group of feature points in a target region of each image frame captured using the mobile visual tracking device.

Accordingly, one or more moving objects can be detected and precisely tracked using the systems, methods, and devices provided herein. The moving objects may include moving objects that do not carry GPS apparatus, moving objects that do not have well-defined features or that do not fall into known object classes, moving objects that cannot be easily detected using conventional object recognition methods, moving objects that collectively form a group whereby the size and/or shape of the group may be amorphous and change over time, a plurality of different objects moving in different formations, or any combination(s) of the above.

It shall be understood that different aspects of the invention can be appreciated individually, collectively, or in combination with each other. Various aspects of the invention described herein may be applied to any of the particular applications set forth below or for any other types of remotely controlled vehicles or movable objects.

The present invention provides embodiments of systems, devices, and/or methods for improving the tracking capabilities of an imaging device, e.g., supported by an unmanned aerial vehicle (UAV), and that enable autonomous tracking of a group of moving objects. Description of the UAV may apply to any type of vehicle, such as land-bound, underground, underwater, water surface, aerial, or space-based vehicles.

FIG. 1 illustrates a block diagram of a visual tracking system 100 comprising an exemplary image analyzer, in accordance with some embodiments. The visual tracking system may be implemented as a stand-alone system, and need not be provided on a vehicle. In some other embodiments, the visual tracking system may be provided on a vehicle. As shown in FIG. 1, the visual tracking system may include an imaging device 110 and an image analyzer 120. The visual tracking system may be configured to identify at least one tracking feature relative to at least one background feature, based on movement characteristics of a plurality of feature points.

An imaging device as used herein may serve as an image capture device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

In some embodiments, the imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

In the example of FIG. 1, the imaging device may be configured to capture image data of a plurality of objects 102. The image data may correspond to, for example, still images or video frames of the plurality of objects. The objects may include any physical object or structure that can be optically identified and/or tracked in real-time by the visual tracking system. Optical tracking has several advantages. For example, optical tracking allows for wireless 'sensors', is less susceptible to noise, and allows for many objects (e.g., different types of objects) to be tracked simultaneously. The objects can be depicted in still images and/or video frames in a 2D or 3D format, can be real-life and/or animated, can be in color, black/white, or grayscale, and can be in any color space.

As shown in FIG. 1, a visual path (denoted by a dotted line) is provided between the imaging device and the plurality of objects, such that the objects lie in the field-of-view of the imaging device. In some embodiments, the objects may be operatively connected to one or more of the components in FIG. 1. For example, the objects may be in communication with one or more of the components in system 100. In some embodiments, the objects may include GPS apparatus (e.g., a GPS receiver) disposed thereon.

In some other embodiments, the objects need not be operatively connected to any of the components in FIG. 1. For example, the objects need not be in communication with any of the components in system 100. The objects also need not include any GPS apparatus (e.g., a GPS receiver) disposed thereon. Instead, the objects can be any stand-alone physical object or structure. Some of the objects may be capable of motion (e.g., translation and/or rotation, land-bound travel, aerial flight, etc.). Any type, range, and magnitude of motion of some or all of the objects may be contemplated, as described below.

The objects may be generally classified into target objects and background objects. Target objects as used herein refer to objects that are capable of motion, and may be moving or stationary at any given point in time. In some instances, when the target objects are moving, the target objects may be referred to as moving objects. Examples of target objects may include a living subject, such as a human or an animal, or a group of humans or a group of animals. Alternatively, the target object may be carried by a living subject, such as a human or an animal, or a movable object such as a vehicle. Background objects as used herein generally refer to objects that are substantially affixed at a location. Background objects may be incapable of motion, such as stationary objects. Examples of background objects may include geographic features, plants, landmarks, buildings, monolithic structures, or any fixed structures.

The target object may also be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

The target object may be capable of moving freely within the environment with respect to six degrees of freedom (e.g., three degrees of freedom in translation and three degrees of freedom in rotation). Alternatively, the movement of the target object can be constrained with respect to one or more degrees of freedom, such as by a predetermined path, track, or orientation. The movement can be actuated by any suitable actuation mechanism, such as an engine or a motor. The actuation mechanism of the target object can be powered by any suitable energy source, such as electrical energy, magnetic energy, solar energy, wind energy, gravitational energy, chemical energy, nuclear energy, or any suitable combination thereof. The target object may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the target object can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

In some embodiments, the target object may be tracked by a tracking device. The tracking device may be an imaging device, or a movable object carrying an image device. The movable object may be, for example, a UAV. The target object may be a same type of movable object as the tracking device, or may be a different type of movable object as the tracking device. For instance, in some embodiments, both the tracking device and the target object may be UAVs. The tracking device and the target object may be the same type of UAV or different types of UAVs. Different types of UAVs may have different shapes, form factors, functionality, or other characteristics. The target object and the tracking device may move in 3-dimensional space relative to the background object. As previously described, examples of background objects may include geographic features (e.g., mountains), landmarks (e.g., bridges), buildings (e.g., skyscrapers, stadiums, etc.), or any fixed structures.

As shown in FIG. 1, the image data captured by the imaging device may be encoded in a plurality of image signals 112. The plurality of image signals may be generated using the imaging device. The image signals may comprise a plurality of image frames captured at different times using the imaging device. For example, the image signals may comprise a first image frame 112-1 captured at time T1 and a second image frame 112-2 captured at time T2, whereby time T2 may be a point in time occurring after time T1. Each image frame may comprise a plurality of pixels. In some embodiments, the plurality of image frames may comprise a plurality of color images, and the plurality of pixels may comprise color pixels. In other embodiments, the plurality of image frames may comprise a plurality of grayscale images, and the plurality of pixels may comprise grayscale pixels. In some embodiments, each pixel in the plurality of grayscale images may have a normalized grayscale value.

The plurality of pixels in the image frames may be associated with a plurality of feature points. A feature point may correspond to a point or an area on an object. In some embodiments, a feature point may be represented by a single pixel in an image frame. For example, each feature point may have a 1:1 correspondence (or 1:1 correlation) with a corresponding pixel. In some embodiments, each feature point may directly correlate with a grayscale value of the corresponding pixel. In some embodiments, a feature point may be represented by a cluster of pixels in an image frame. For example, each feature point may have a 1:n correspondence (or 1:n correlation) with n pixels, where n is any integer greater than 1. The cluster of pixels may include 2, 3, 4, 5, 6, 7, 8, 9, 10, or more pixels. All pixels can be individually analyzed, either simultaneously or sequentially. Likewise, all clusters of pixels can be individually analyzed, either simultaneously or sequentially. Analysis of clusters of pixels can help to reduce the processing time (as well as processing power) required to analyze all pixels in an image frame. Movement characteristics of the one or more pixel(s) may be analyzed to determine one or more feature points associated with those pixel(s), as described later in the specification.

In some particular embodiments, a feature point can be a portion of an image (e.g., an edge, corner, interest point, blob, ridge, etc.) that is uniquely distinguishable from the remaining portions of the image and/or other feature points in the image. Optionally, a feature point may be relatively invariant to transformations of the imaged object (e.g., translation, rotation, scaling) and/or changes in the characteristics of the image (e.g., brightness, exposure). A feature point may be detected in portions of an image that is rich in terms of informational content (e.g., significant 2D texture). A feature point may be detected in portions of an image that are stable under perturbations (e.g., when varying illumination and brightness of an image).

Feature points can be detected using various algorithms (e.g., texture detection algorithm) which may extract one or more feature points from image data. The algorithms may additionally make various calculations regarding the feature points. For example, the algorithms may calculate a total number of feature points, or "feature point number." The algorithms may also calculate a distribution of feature points. For example, the feature points may be widely distributed within an image (e.g., image data) or a subsection of the image. For example, the feature points may be narrowly distributed within an image (e.g., image data) or a subsection of the image. The algorithms may also calculate a quality of the feature points. In some instances, the quality of feature points may be determined or evaluated based on a value calculated by algorithms mentioned herein (e.g., FAST, Corner detector, Harris, etc).

The algorithm may be an edge detection algorithm, a corner detection algorithm, a blob detection algorithm, or a ridge detection algorithm. In some embodiments, the corner detection algorithm may be a "Features from accelerated segment test" (FAST). In some embodiments, the feature detector may extract feature points and make calculations regarding feature points using FAST. In some embodiments, the feature detector can be a Canny edge detector, Sobel operator, Harris & Stephens/Plessy/Shi-Tomasi corner detection algorithm, the SUSAN corner detector, Level curve curvature approach, Laplacian of Gaussian, Difference of Gaussians, Determinant of Hessian, MSER, PCBR, or Grey-level blobs, ORB, FREAK, or suitable combinations thereof.

In some embodiments, a feature point may comprise one or more non-salient features. As used herein, non-salient features may refer to non-salient regions or non-distinct (e.g., non-recognizable) objects within an image. Non-salient features may refer to elements within an image that are unlikely to stand out or catch attention of a human observer. Examples of non-salient features may include individual pixels or groups of pixels that are non-distinct or non-identifiable to a viewer, when viewed outside of the context of their surrounding pixels.

In some alternative embodiments, a feature point may comprise one or more salient features. Salient features may refer to salient regions or distinct (e.g., recognizable) objects within an image. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc), and the like. For example, salient features may include humans, animals, faces, bodies, structures, buildings, vehicles, planes, signs, and the like.

Salient features may be identified or determined using any existing saliency calculating methods. For example, salient features may be identified by contrast based filtering (e.g., color, intensity, orientation, size, motion, depth based, etc), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc than non-salient regions. In some embodiments, salient features may be identified using object recognition algorithms (e.g., feature based methods, appearance based methods, etc). Optionally, one or more objects or types of patterns, objects, figures, colors, logos, outlines, etc may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

In some embodiments, the imaging device may be mounted or co-located on a tracking device (not shown). The tracking device can be, for example, vehicles that are capable of traveling in the air, on land, on water, or within a water body. Examples of vehicles may include an aerial vehicle (e.g., a UAV), a land-bound vehicle (e.g., a car), a water-bound vehicle (e.g., a boat), etc. In some embodiments, the tracking device may be a mobile device, a cell phone or smartphone, a personal digital assistant (PDA), a computer, a laptop, a tablet PC, a media content player, a video game station/system, wearable devices such as a virtual reality headset or a head mounted device (HMD), or any electronic device capable of capturing, providing or rendering image data, and/or identifying or tracking a target object based on the image data. The tracking device may further include software applications that allow the tracking device to communicate with and receive image data from the imaging device. The tracking device may be configured to provide the image data to the image analyzer for image analysis. In some instances, the tracking device may be self-propelled, can be stationary or moving, and may change orientation (e.g., attitude) over time.

As another example, the tracking device can be a web server, an enterprise server, or any other type of computer server. The tracking device can be a computer programmed to accept requests (e.g., HTTP, or other protocols that can initiate data transmission) from the image analyzer and to serve the image analyzer with requested image data. In some embodiments, the tracking device can be a broadcasting facility, such as free-to-air, cable, satellite, and other broadcasting facility, for distributing image data.

In some embodiments, the image data captured by the imaging device may be stored in a media storage (not shown) before the image data is provided to the image analyzer. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be provided as a CD, DVD, Blu-ray disc, hard disk, magnetic tape, flash memory card/drive, solid state drive, volatile or non-volatile memory, holographic data storage, and any other type of storage medium. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the tracking device but off-board the imaging device. In some further embodiments, the media storage may be located on one or more external devices off-board the tracking device and/or the imaging device. In those further embodiments, the media storage may be located on a remote controller, a ground station, a server, etc. Any arrange or combination of the above components may be contemplated. In some embodiments, the media storage may communicate with the imaging device and the tracking device via a peer-to-peer network architecture. In some embodiments, the media storage may be implemented using a cloud computing architecture.

The image data may be provided (in the form of image signals 112) to the image analyzer for image processing/analysis. In the example of FIG. 1, the image analyzer can be implemented as a software program executing in a processor and/or as hardware that analyzes the plurality of image frames to identify at least one tracking feature relative to at least one background feature from the plurality of feature points. For example, the image analyzer may be configured to analyze the image frames to compute movement characteristics of the plurality of feature points, and to identify at least one tracking feature relative to at least one background feature based on the movement characteristics of the plurality of feature points. The tracking feature may be associated with one or more target objects. The background feature may be associated with one or more background objects.

The image analyzer may be configured to determine the relative positions between the target object and the background object based on the movement characteristics of the plurality of feature points. The imaging device may be stationary or mobile. The background object is typically stationary. The target object may be stationary or mobile. In some embodiments, the tracking feature and background feature may be identified while at least one of the imaging device or the target object is in motion or is capable of motion. At any given moment in time, the imaging device or the target object may be capable of moving and/or stopping. For instance a UAV supporting the imaging device may hover for a period of time before moving to another location.

In some embodiments, the image analyzer may be located remotely from the imaging device. For example, the image analyzer may be disposed in a remote server that is in communication with the imaging device. The image analyzer may be provided at any other type of external device (e.g., a remote controller for a tracking device, an object carried by the target object, a reference location such as a base station, or another tracking device), or may be distributed on a cloud computing infrastructure. In some embodiments, the image analyzer and the media storage may be located on a same device. In other embodiments, the image analyzer and the media storage may be located on different devices. The image analyzer and the media storage may communicate either via wired or wireless connections. In some embodiments, the image analyzer may be located on a tracking device. For example, the image analyzer may be disposed in a housing of the tracking device. In some other embodiments, the image analyzer may be located on the target object. For example, the image analyzer may be disposed on a body of the target object. In some other embodiments, the image analyzer may be located on the background object. For example, the image analyzer may be disposed on a body of the background object. In some further embodiments, the image analyzer may be disposed at a base station that is in communication with the tracking device and/or the target object. The image analyzer may be located anywhere, as long as the image analyzer is capable of: (i) receiving a plurality of image frames captured at different times using an imaging device, (ii) analyzing the plurality of image frames to compute movement characteristics of the plurality of feature points, and (iii) identifying at least one tracking feature relative to at least one background feature based on the movement characteristics of the plurality of feature points. The image analyzer may communicate with one or more of the aforementioned tracking device, target object, background object, base station, or any other device to receive image data from which movement characteristics of a plurality of feature points can be computed, and from which a tracking feature relative to a background feature can be identified.

In some embodiments, the resulting analysis of the image frames may be provided (in the form of analyzed signals 122) to an output device (not shown). For example, the identified tracking feature and background feature may be depicted in one or more resulting image frames that are displayed on the output device. The resulting image frames may be encoded in the analyzed signals 122. The resulting image frames may include annotations (e.g., labels, circled regions, different color coding, etc.) distinguishing the tracking feature from the background feature. The output device can be a display device such as, for example, a display panel, monitor, television, projector, or any other display device. In some embodiments, the output device can be, for example, a cell phone or smartphone, personal digital assistant (PDA), computer, laptop, desktop, a tablet PC, media content player, set-top box, television set including a broadcast tuner, video game station/system, or any electronic device capable of accessing a data network and/or receiving analyzed image data from the image analyzer.

In some embodiments, the components 110 and 120 may be located on separate discrete devices. In those embodiments, the devices (on which components 110 and 120 are respectively located) may be operatively connected to each other via a network or any type of communication links that allow transmission of data from one component to another. The network may include the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

While shown in FIG. 1 as separate components that are operatively connected, it is noted that the imaging device and the image analyzer may be co-located in one device. For example, the image analyzer can be located within or form part of the imaging device. Conversely, the imaging device can be located within or form part of the image analyzer. In some embodiments, at least one of the imaging device or the image analyzer may be co-located on a user device. In some embodiments, a media storage may be located within or form part of the imaging device. In some embodiments, at least one of the imaging device or the image analyzer can be located within or form part of a mobile visual tracking device. The mobile visual tracking device may be mounted on (or enabled using) an aerial vehicle, for example a UAV. It is understood that the configuration shown in FIG. 1 is for illustrative purposes only. Certain components or devices may be removed or combined, and other components or devices may be added.

As previously described, the image analyzer may be configured to analyze the plurality of image frames to compute movement characteristics of the plurality of feature points, and to identify at least one tracking feature relative to at least one background feature based on the movement characteristics of the plurality of feature points. In some implementations, the feature points may each correspond to a single pixel or a group of pixels. Any description of analysis based on feature points may also apply to analysis based on individual pixels or groups of pixels. This may occur without regard to any property of the pixel(s) (e.g., brightness, color, contrast, etc.). Alternatively, one or more of such property of the pixel(s) may be taken into account. The aforementioned steps can be implemented using an optical flow algorithm, and will be described in further detail with reference to FIG. 2. The optical flow algorithm may be performed using the image analyzer. The optical flow algorithm can be used to compute the motion of pixels or feature points of an image sequence, and can provide a dense (point-to-point) pixel or feature point correspondence.

Figure 2:
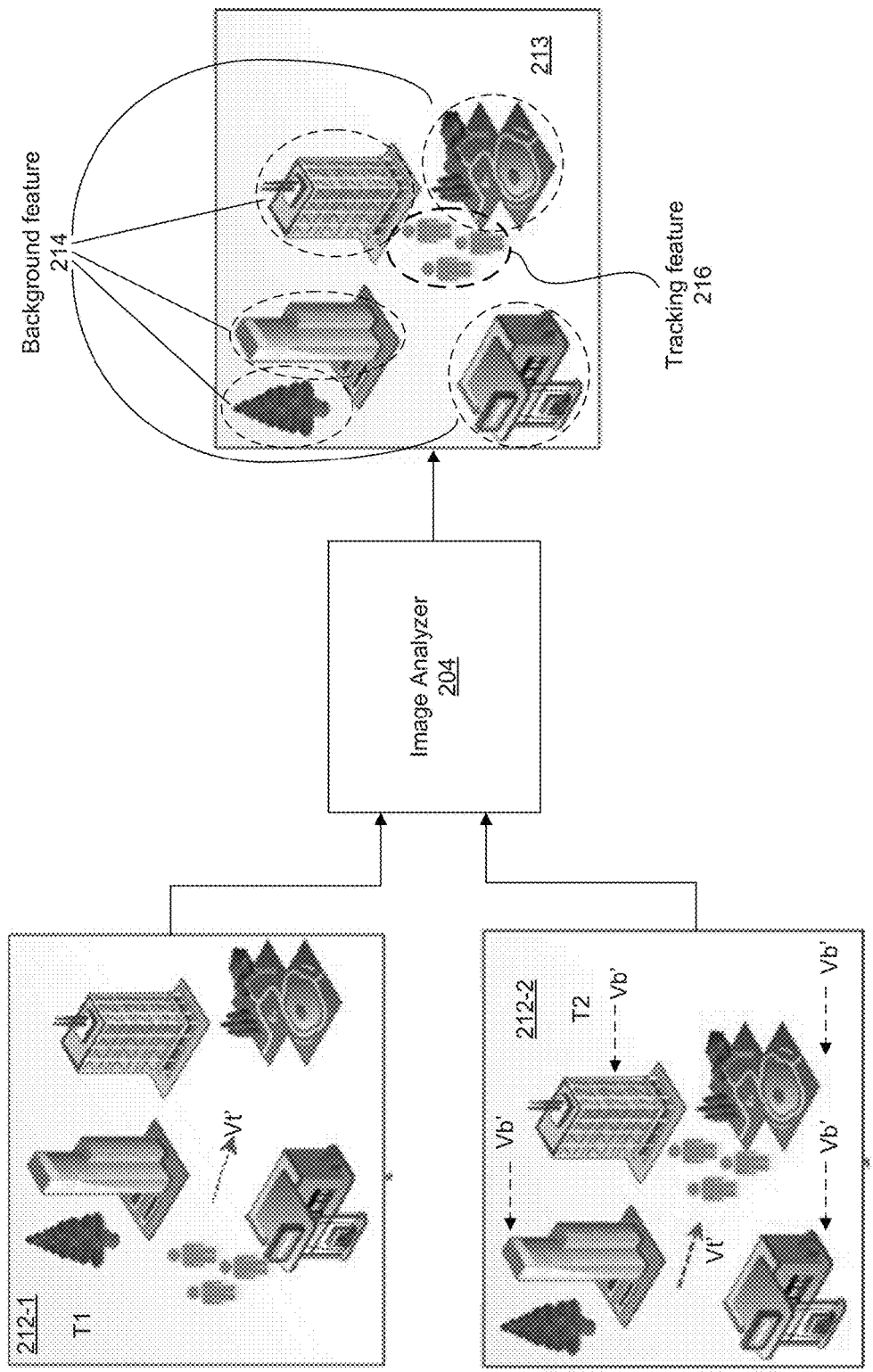
FIG. 2 illustrates the identification of a tracking feature and a background feature in a sequence of exemplary image frames using the image analyzer of FIG. 1, in accordance with some embodiments.

FIG. 2 illustrates the identification of tracking features and background features in exemplary images using the image analyzer of FIG. 1, in accordance with some embodiments. Referring to FIG. 2, an image analyzer 204 may receive a plurality of image signals 212 from an imaging device (e.g., imaging device 110 of FIG. 1). The image signals 212 may comprise a first image frame 212-1 captured at time T1 and a second image frame 212-2 captured at time T2, whereby time T2 may be a point in time occurring after time T1. Although FIG. 2 depicts two image frames, any number of images frames may be contemplated. For example, in some embodiments, the image signals 212 may comprise a plurality of image frames 212-1 to 212-n captured over a period of time starting from T1 to Tn, where n may be any integer greater than 1.

In some embodiments, more than one image frame may be captured at a particular time instance. For example, the image signals 212 may comprise a plurality of image frames 212-1 captured at time T1, a plurality of image frames 212-2 captured at time T2, etc. The plurality of image frames at each time instance may be averaged and transformed into a single image frame associated with that particular time instance. In some embodiments, 1, 2, 3, 4, 5, or more image frames may be captured every second. In some embodiments, an image frame may be captured every 2 second, 3 seconds, 4 seconds, 5 seconds, or more than 5 seconds. The image frames may be captured at a fixed frequency or at different frequencies. For example, a greater number of image frames may be captured when the target object is moving quickly, and a fewer number of image frames may be captured when the target object is moving slowly. In some embodiments, the image analyzer may be configured to analyze only those image frames that have different pixel (or feature point) movement characteristics between the image frames.

Each image frame may comprise a plurality of pixels that are associated with a plurality of feature points. As shown in FIG. 2, the feature points may be associated with target objects (e.g., a group of people) and background objects (e.g., buildings, trees, golf course, gas station, etc.). In the example of FIG. 2, the target objects may be located at a first position at time T1 (see first image frame 212-1) and moved to a second position at time T2 (see second image frame 212-2).

The image analyzer may be configured to analyze the plurality of image frames to compute movement characteristics of the plurality of feature points. The movement characteristics of the plurality of feature points may comprise positional differences, and at least a velocity or an acceleration of each feature point. Comparing image frames 212-1 and 212-2, it may be observed that the feature points associated with the background objects may have "moved" substantially from right to left between the images at a velocity Vb', whereas the feature points associated with the target objects may have "moved" substantially from left to right between the images at a velocity Vt'. The apparent translation of the background objects in the image frames may be attributed to the fact that the imaging device may be in motion when capturing the image frames.

The image analyzer may be further configured to identify at least one tracking feature relative to at least one background feature. This may comprise differentiating, based on the movement characteristics of the plurality of feature points, a first set of feature points and a second set of feature points from among the plurality of feature points. The first set of feature points may have substantially a first movement characteristic, and the second set of feature points may have substantially a second movement characteristic different from the first movement characteristic. For example, in FIG. 2, the feature points associated with the background objects may have substantially a first movement characteristic (e.g., right-to-left from image 212-1 to image 212-2 at velocity Vb'), whereas the feature points associated with the target objects may have substantially a second movement characteristic (e.g., left-to-right from image 212-1 to image 212-2 at velocity Vt'). Accordingly, the image analyzer may identify the feature points associated with the background objects as a first set of feature points, and the feature points associated with the target objects as a second set of feature points. The image analyzer may be further configured to identify background feature 214 as the first set of feature points and tracking feature 216 as the second set of feature points. By comparing the movement characteristics of the feature points, the tracking feature may be associated with the target objects, whereas the background feature may be associated with the background objects. The background feature may have substantially a same movement characteristic associated with the first movement characteristic of the first set of feature points. The tracking feature may have substantially a same movement characteristic associated with the second movement characteristic of the second set of feature points.

In some embodiments, the image analyzer can identify the tracking feature and the background feature based only on the movement characteristics of the plurality of feature points. Accordingly, the image analyzer can identify the tracking feature and the background feature independent of an object recognition method. For example, the background feature and the tracking feature may be defined independent of any object class. This is in contrast to conventional vision-based tracking methods that typically identify features by classifying them into one or more object classes, or fitting them to one or more known models.

In some particular embodiments, after the image analyzer has identified the tracking feature and the background feature, the image analyzer may be further configured to categorize the tracking feature and the background feature into one or more object classes using an object recognition method. The object recognition method may comprise determining whether each of the tracking feature and the background feature belongs to one or more object classes. The object classes may comprise a building object class, a landscape object class, a people object class, an animal object class, and/or a vehicle object class. The object recognition method may be based on alignment models, invariant properties, and/or parts decomposition.

In some embodiments, the image analyzer may be configured to analyze the plurality of image frames using a pixel-based approach. For example, in those embodiments, the plurality of feature points may have a one-to-one correspondence to the plurality of pixels in the plurality of image frames. In other words, each feature point may correspond to a unique pixel. The image analyzer may be configured to analyze the plurality of image frames to compute movement characteristics of the plurality of pixels. The movement characteristics of the plurality of pixels may comprise positional differences, and at least one of a velocity or an acceleration of each pixel. Comparing image frames 212-1 and 212-2, it may be observed that the pixels associated with the background objects have "moved" substantially from right to left between the images at a velocity Vb', whereas the pixels associated with the target objects have "moved" substantially from left to right between the images at a velocity Vt'. The apparent translation of the background objects in the image frames may be attributed to the fact that the imaging device may be in motion when capturing the image frames.

The image analyzer may be further configured to differentiate, based on the movement characteristics of the plurality of pixels, a first set of pixels and a second set of pixels from among the plurality of pixels. The first set of pixels may have substantially a first movement characteristic, and the second set of pixels may have substantially a second movement characteristic different from the first movement characteristic. For example, in FIG. 2, the pixels associated with the background objects may have substantially a first movement characteristic (e.g., right-to-left from image 212-1 to 212-2 at velocity Vb'), whereas the pixels associated with the target objects may have substantially a second movement characteristic (e.g., left-to-right from image 212-1 to 212-2 at velocity Vt'). Accordingly, the image analyzer may identify the pixels associated with the background objects as a first set of pixels, and the pixels associated with the target objects as a second set of pixels. The image analyzer may be further configured to identify the background feature 214 as the first set of pixels and the tracking feature 216 as the second set of pixels. By comparing the movement characteristics of the pixels, the tracking feature may be associated with the target objects, whereas the background feature may be associated with the background objects. The background feature may have substantially a same movement characteristic associated with the first movement characteristic of the first set of pixels. The tracking feature may have substantially a same movement characteristic associated with the second movement characteristic of the second set of pixels.

As mentioned above, the image analyzer may be configured to analyze the plurality of image frames using the above-described pixel-based approach. The pixel-based approach can be used in illuminated environments, and also in low-light or dark environments. For example, the image analyzer can analyze thermal images (thermograms) obtained from a thermal imaging device using the pixel-based approach, and identify the background feature and the tracking feature based on movement characteristics of the pixels in the thermal images. Each pixel in the thermal images may be indicative of an amount of infrared energy emitted, transmitted, and/or reflected at a feature point in the target objects and the background objects. The pixel-based approach for analyzing thermal images may be well-suited for low-light or dark environments, since optical images captured in low-light or dark environments tend to have low brightness/contrast that makes it difficult to track the movement characteristics between different pixels.

In some embodiments, the image analyzer may be further configured to identify the background feature 214 by generating one or more contour(s) surrounding the first set of pixels, and to identify the tracking feature 216 by generating another contour surrounding the second set of pixels, as shown by the dotted circled regions in FIG. 2. The contours serve to distinguish the tracking feature 216 from the background feature 214. The contours may include different colors, patterns, or shading to differentiate the tracking feature from the background feature. The image analyzer may be further configured to generate a resulting image frame 213 depicting the identified tracking feature and background feature, as shown in FIG. 2. As previously mentioned, the resulting image frame may be provided (for example, in the form of analyzed signals 122) to an output device, such as a display device.

Figure 3:
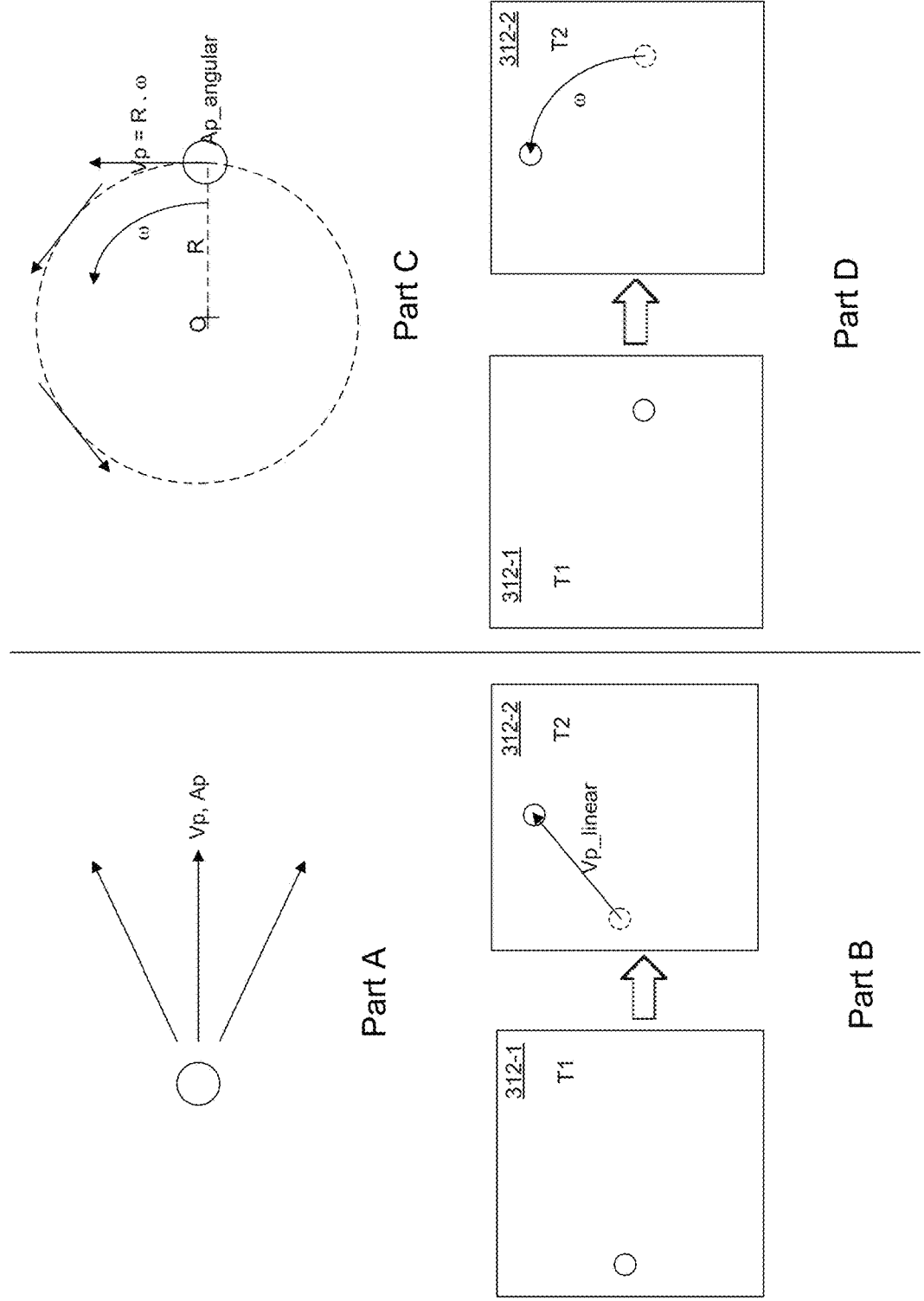
FIG. 3 illustrates different movement characteristics of a pixel in the image frames, in accordance with some embodiments.

FIG. 3 illustrates different movement characteristics of a pixel in the image frames, in accordance with some embodiments. As previously described, the plurality of image frames may comprise at least a first image frame and a second image frame. The image analyzer may be configured to compute the movement characteristic of each pixel, for each pixel appearing in the first image frame and the second image frame. For example, the image analyzer may be configured to identify a position of each pixel in the first image frame and its corresponding position in the second image frame, and compute the movement characteristic of each pixel based on a difference between its positions in the first and second image frames. In some embodiments, the image analyzer may be configured to map the plurality of image frames, generate a transformation for each pixel based on the mapping, and compute the movement characteristic of each pixel using its transformation. The movement characteristic of a pixel appearing in the first and second frames may comprise of a velocity of the pixel. The velocity of the pixel may be calculated using the following equation:

$$V_p = C \cdot (T_{ref} - T_{current}),$$

where $V_p$ is the velocity of the pixel, C is a speed constant, $T_{ref}$ is a reference transformation based on the position of the pixel in the first image frame, and $T_{current}$ is a current transformation based on the position of the pixel in the second image frame. The velocity $V_p$ may include both a vector component and a scalar component. An acceleration $A_p$ of the pixel may be calculated by the change in velocity of the pixel over time:

$$A_p = \Delta V_p / \Delta T$$

The velocity of a pixel may further comprise a linear velocity and/or an angular velocity of the pixel. The acceleration of a pixel may further comprise a linear acceleration and/or an angular acceleration of the pixel. For example, referring to FIG. 3 (Part A), the movement characteristic of a pixel may comprise a linear velocity and/or a linear acceleration when the pixel translates along a direction between its position in the first image frame to its position in the second image frame. As shown in FIG. 3 (Part B), the pixel may be at a first position in a first image frame 312-1 at time T1, and may have moved to a second position in a second image frame 312-2 at time T2. In the example of FIG. 3 (Part B), the movement of the pixel from the first position to the second position may be via translation (denoted by a straight arrow line), and may comprise a linear velocity $V_{p\_linear}$.

In some embodiments, for example as shown in FIG. 3 (Part C), the movement characteristic of a pixel may comprise an angular velocity ω and/or an angular acceleration $A_{p\_angular}$ when the pixel is rotating about a point O between its position in the first image frame to its position in the second image frame. A linear speed of the pixel may be given by $V_{p\_linear} = R \cdot \omega$, where R is a distance from the pixel to the point O (or radius of a circle with center point O). As shown in FIG. 3 (Part D), the pixel may be at a first position in a first image frame 312-1 at time T1, and moved to a second position in image frame 312-2 at time T2. In the example of FIG. 3 (Part D), the pixel may move from the first position to the second position in a curvilinear direction (denoted by a curved arrow line) at an angular velocity ω.

As previously described, the tracking feature 216 may be identified by generating a contour surrounding the second set of pixels (or feature points associated with the target objects). In some embodiments, a size of the contour may change, for example, as shown in FIGS. 4, 5, 6, and 7.

Figure 4:
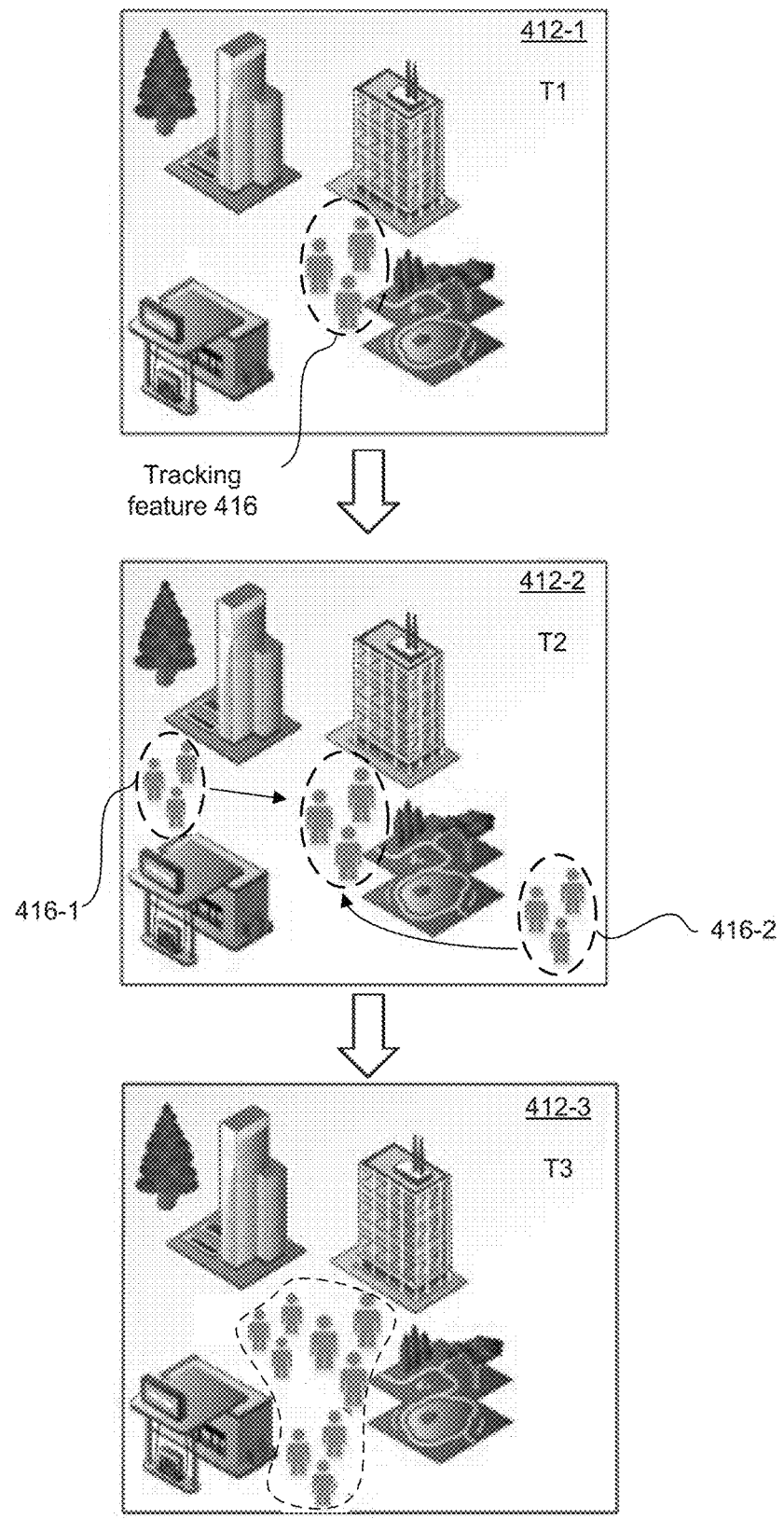
FIG. 4 illustrates a sequence of exemplary image frames whereby the size of the contour surrounding a tracking feature increases, in accordance with some embodiments.

FIG. 4 illustrates an exemplary sequence of image frames whereby the size of the contour surrounding a tracking feature may increase, in accordance with some embodiments. Specifically, FIG. 4 illustrates that the size of the contour surrounding the tracking feature may increase when more target objects (e.g., people, vehicles, animals, etc.) join a pre-existing group of target objects. As shown in FIG. 4, a first image frame 412-1, a second image frame 412-2, and a third image frame 412-3 may be captured by an imaging device at times T1, T2, and T3, respectively. The first image frame may correspond, for example, to the resulting image frame 213 shown in FIG. 2. The first image frame may comprise a first tracking feature 416 comprising a group of target objects that have been previously identified by the image analyzer. At time T2, additional tracking features 416-1 and 416-2 may be identified by the image analyzer at the left portion and bottom right portion of the second image frame. The additional tracking features may move towards the first tracking feature and converge with the first tracking feature at time T3, as illustrated by the third image frame 412-3. The size of the pixels (or feature points) associated with the target objects may increase from T1 and T3 due to the convergence of the tracking features. Accordingly, the size of the contour surrounding those pixels (or tracking features) may increase as the number of target objects increases in the image frame. In some embodiments, the converged tracking features may be collectively treated as a common group of tracking features. In some alternative embodiments, the image analyzer may continue to track each individual tracking feature 416-1, 416-2, and 416-3 even after the tracking features have apparently merged into a single group. In some embodiments, whether the tracking features are tracked individually or collectively as a group may depend on a distance between adjacent tracking features. For example, if the distance between adjacent features is greater than a predetermined distance, the tracking features may be tracked individually since the tracking features may have a low spatial density. Conversely, if the distance between adjacent features is less than a predetermined distance, the tracking features may be tracked collectively as a single group since the tracking features may have a high spatial density. The predetermined distance may be determined based on a size, shape, or areal density of the target objects. In some embodiments, when the size of the contour surrounding the tracking feature starts to increase, the imaging device may move to a higher vertical location relative to the target objects, or a further lateral distance away from the target objects, so that the tracking feature can be substantially positioned in the field-of-view of the imaging device or in a target region of the image frames captured by the imaging device.

Figure 5:
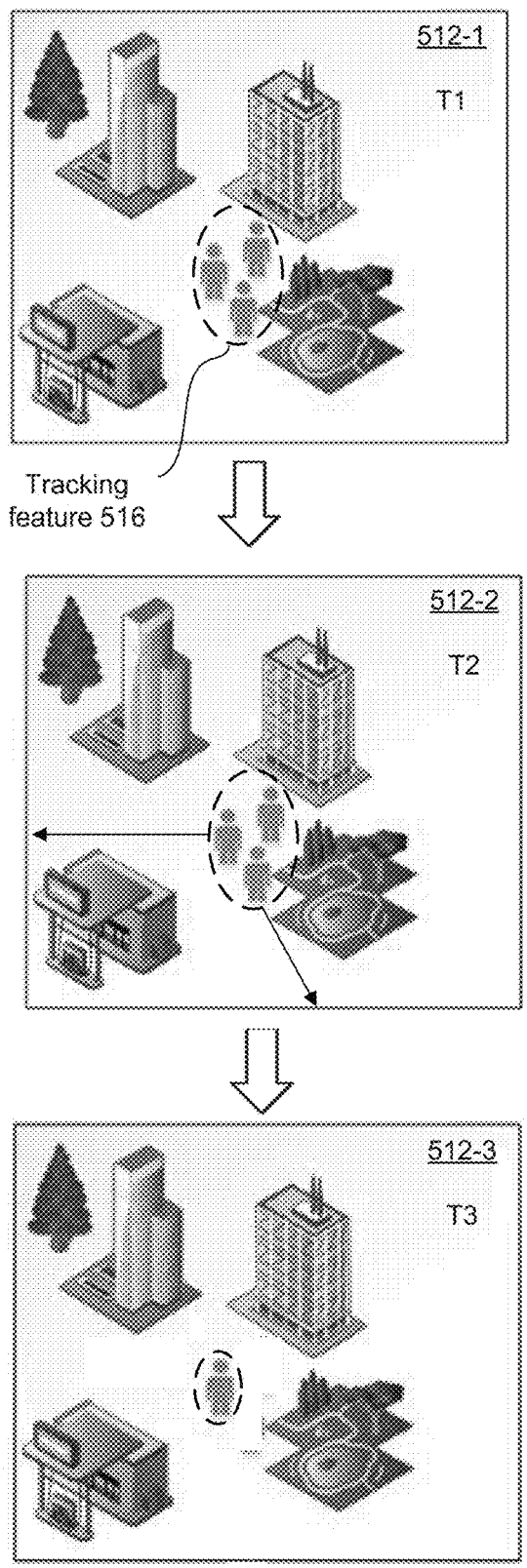
FIG. 5 illustrates a sequence of exemplary image frames whereby the size of the contour surrounding a tracking feature decreases, in accordance with some embodiments.

FIG. 5 illustrates an exemplary sequence of image frames whereby the size of the contour surrounding a tracking feature may decrease, in accordance with some embodiments. Specifically, FIG. 5 illustrates that the size of the contour surrounding the tracking feature may decrease when one or more target objects leaves a pre-existing group of target objects. As shown in FIG. 5, a first image frame 512-1, a second image frame 512-2, and a third image frame 512-3 may be captured at times T1, T2, and T3, respectively. The first image frame may correspond, for example, to the resulting image frame 213 shown in FIG. 2. The first image frame may comprise a first tracking feature 516 comprising a group of target objects that have been previously identified by the image analyzer. Some of the target objects may begin to diverge (disperse) from the group at time T2 and may have moved outside of the field-of-view of the imaging device at time T3, as illustrated by the third image frame 512-3. The size of the pixels (or feature points) associated with the target objects may decrease from T1 and T3 due to the reduction in size of the group of target objects. Accordingly, the size of the contour surrounding those pixels (or tracking feature) may decrease as the number of target objects decreases. In some embodiments, when the size of the contour surrounding the tracking feature starts to decrease, the imaging device may move to a lower vertical location relative to the target objects, or a shorter lateral distance away from the target objects, so that the tracking feature can be substantially positioned in the field-of-view of the imaging device or in a target region of the image frames captured by the imaging device.

Figure 6:
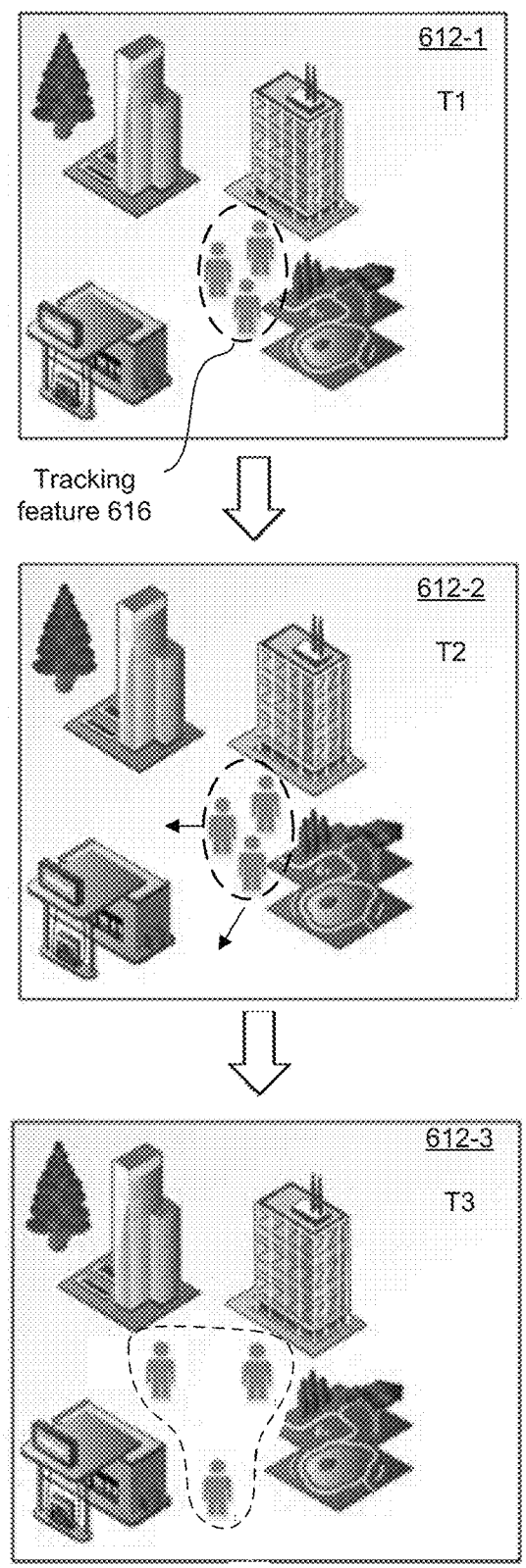
FIG. 6 illustrates a sequence of exemplary image frames whereby the size of the contour surrounding a tracking feature increases, in accordance with some other embodiments.

In some embodiments, the size of the contour surrounding a tracking feature may be defined by the positions of the outermost target objects within the group. FIG. 6 illustrates an exemplary sequence of image frames whereby the size of the contour surrounding a tracking feature may increase, in accordance with some other embodiments. For example, as shown in FIG. 6, a first image frame 612-1, a second image frame 612-2, and a third image frame 612-3 may be captured at times T1, T2, and T3, respectively. The first image frame may correspond, for example, to the resulting image frame 213 shown in FIG. 2. The first image frame may comprise a first tracking feature 616 comprising a group of target objects that have been previously identified by the image analyzer. The target objects may begin to diverge from the group at time T2. However, those target objects still remain in the field-of-view of the imaging device at time T3, as illustrated by the third image frame 612-3. The size of the pixels (or feature points) associated with the target objects may increase from T1 and T3 due to the divergence of the group of target objects. Accordingly, the size of the contour surrounding those pixels (or tracking feature) may increase as the target objects become more spaced apart to occupy a larger area. In some embodiments, when the size of the contour surrounding the tracking feature starts to increase, the imaging device may move to a higher vertical location relative to the target objects, or a further lateral distance away from the target objects, so that the tracking feature can be substantially positioned in the field-of-view of the imaging device or in a target region of the image frames captured by the imaging device.

Figure 7:
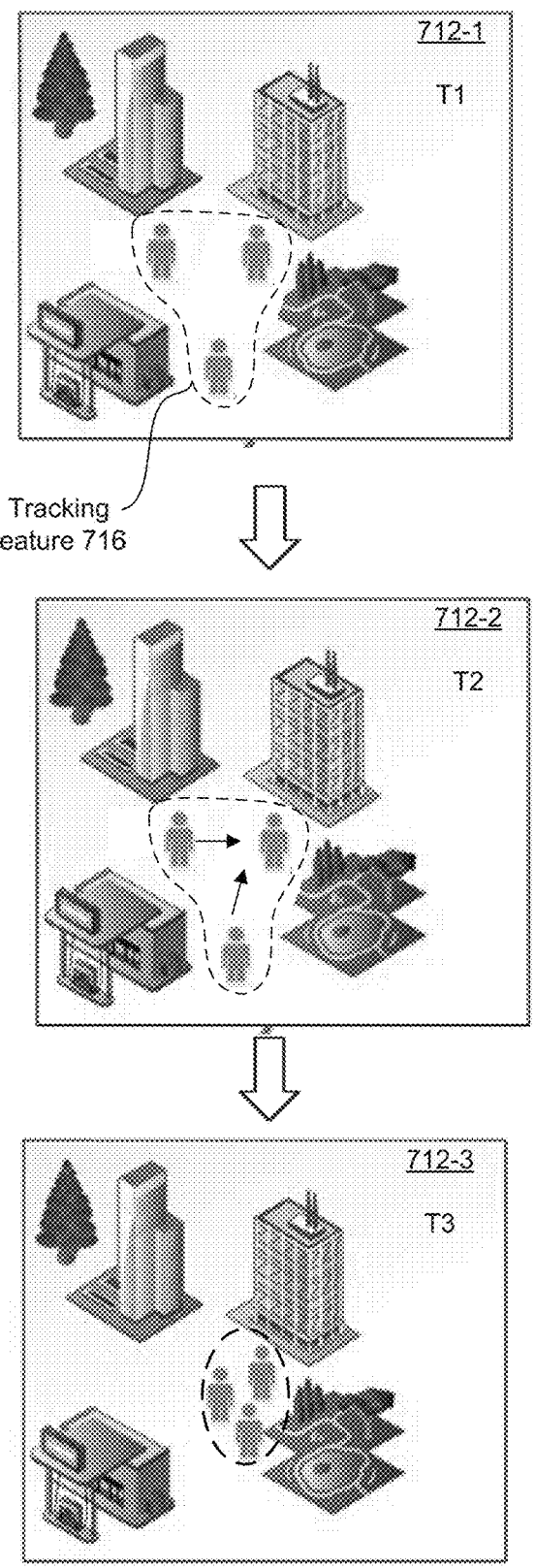
FIG. 7 illustrates a sequence of exemplary image frames whereby the size of the contour surrounding a tracking feature decreases, in accordance with some other embodiments.

Similarly, FIG. 7 illustrates an exemplary sequence of image frames whereby the size of the contour surrounding a tracking feature may decrease, in accordance with some other embodiments. For example, as shown in FIG. 7, a first image frame 712-1, a second image frame 712-2, and a third image frame 712-3 may be captured at times T1, T2, and T3, respectively. The first image frame may correspond, for example, to image frame 612-3 shown in FIG. 6. The first image frame may comprise a first tracking feature 716 comprising a group of target objects that have been previously identified by the image analyzer. The target objects may begin to converge at time T2. At time T3, the target objects may have converged to a smaller area, as illustrated by the third image frame 712-3. The size of the pixels (or feature points) associated with the target objects may decrease from T1 and T3 due to the convergence of the group of target objects. Accordingly, the size of the contour surrounding those pixels (or tracking feature) may decrease as the target objects converge onto a smaller area. In some embodiments, when the size of the contour surrounding the tracking feature starts to decrease, the imaging device may move to a lower vertical location relative to the target objects, or a shorter lateral distance away from the target objects, so that the tracking feature can be substantially positioned in the field-of-view of the imaging device or in a target region of the image frames captured by the imaging device.

In the examples of FIGS. 4, 5, 6, and 7, the target objects may correspond to group(s) of people. However, it is noted that the target objects are not limited thereto. The size and/or shape of the contour surrounding the tracking feature may change with the movement, convergence, divergence, addition, and/or subtraction of one or more target objects of different object classes (e.g., a combination of people, vehicles, animals, etc.), for example as shown in FIG. 8. Any change in the size and/or shape of the contour surrounding the tracking feature may be contemplated. The size and/or shape of the contour may be amorphous and may change as the number of target objects changes (i.e., change in areal density of the target objects), or when the target objects move collectively in a random manner, for example as shown in FIG. 9. In the example of FIG. 9, each contour may contain a plurality of feature points (or pixels) associated with the target objects. Individual target objects within a contour may or may not be identified or tracked, as long as the target objects have substantially a same movement characteristic. In some embodiments, the size of the contour may increase when the imaging device is located closer to the target objects (due to magnification). Conversely, the size of the contour may decrease when the imaging device is located further away from the target objects (due to de-magnification).

In some embodiments, the image analyzer may be configured to determine that the tracking feature is moving relative to the background feature, based on the movement characteristics of the feature points. For example, referring back to FIG. 2, the image analyzer can determine that the tracking feature 216 is moving relative to the background feature 214 based on the movement characteristics of the feature points determined from image frames 212-1 and 212-2 at times T1 and T2.

Figure 10:
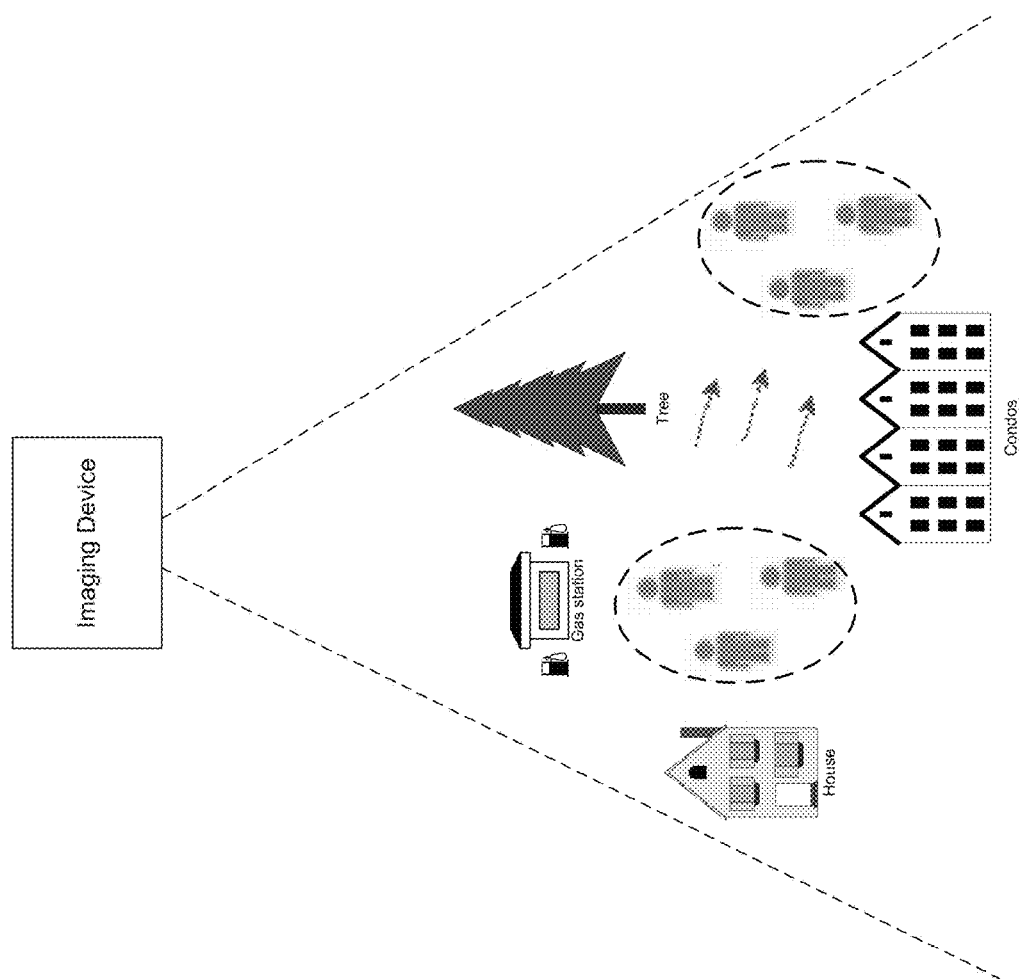
FIGS. 10, 11, and 12 illustrate the tracking of target objects by an imaging device whereby a size and/or shape of a contour surrounding a tracking feature remains relatively constant as the target objects move from one location to another, in accordance with different embodiments.
Figure 11:
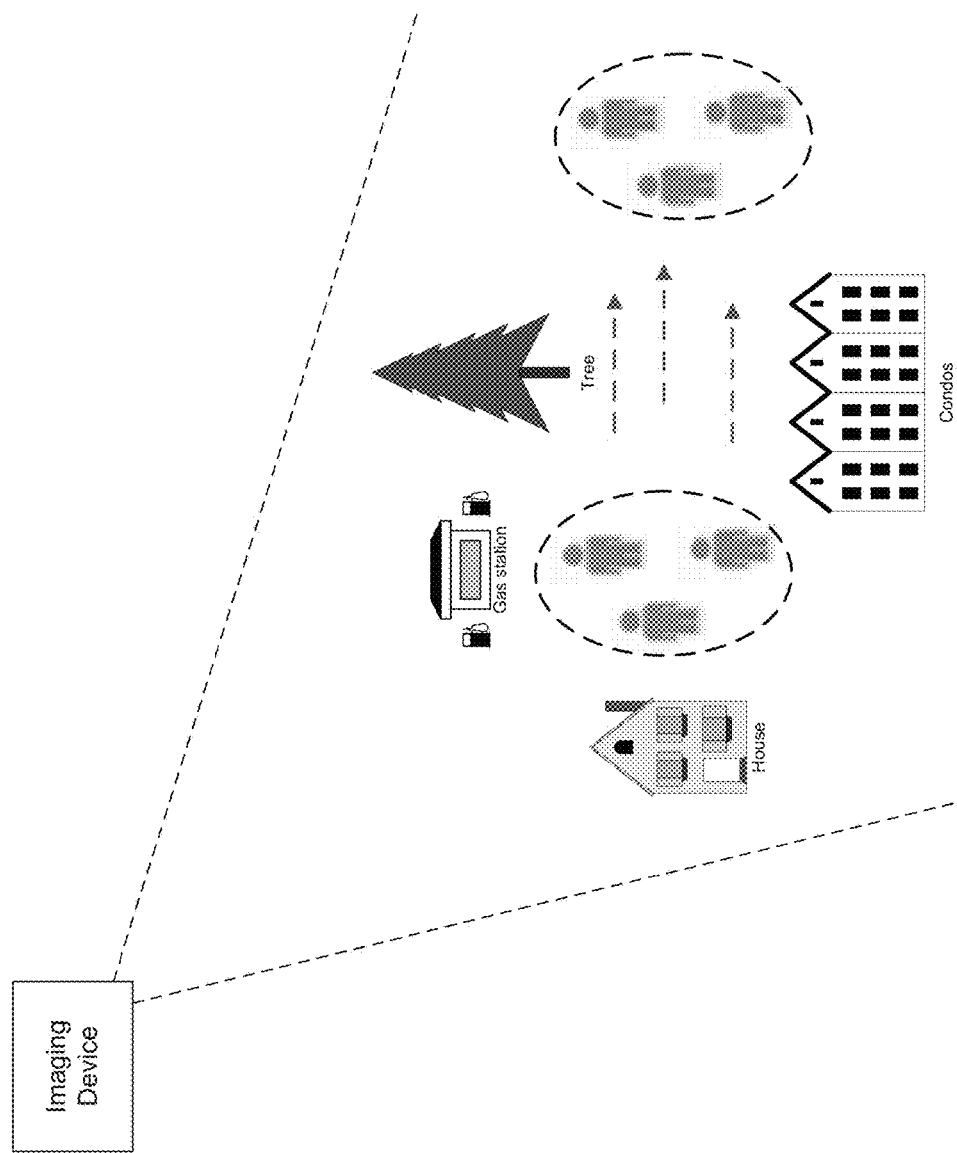
Figure 12:
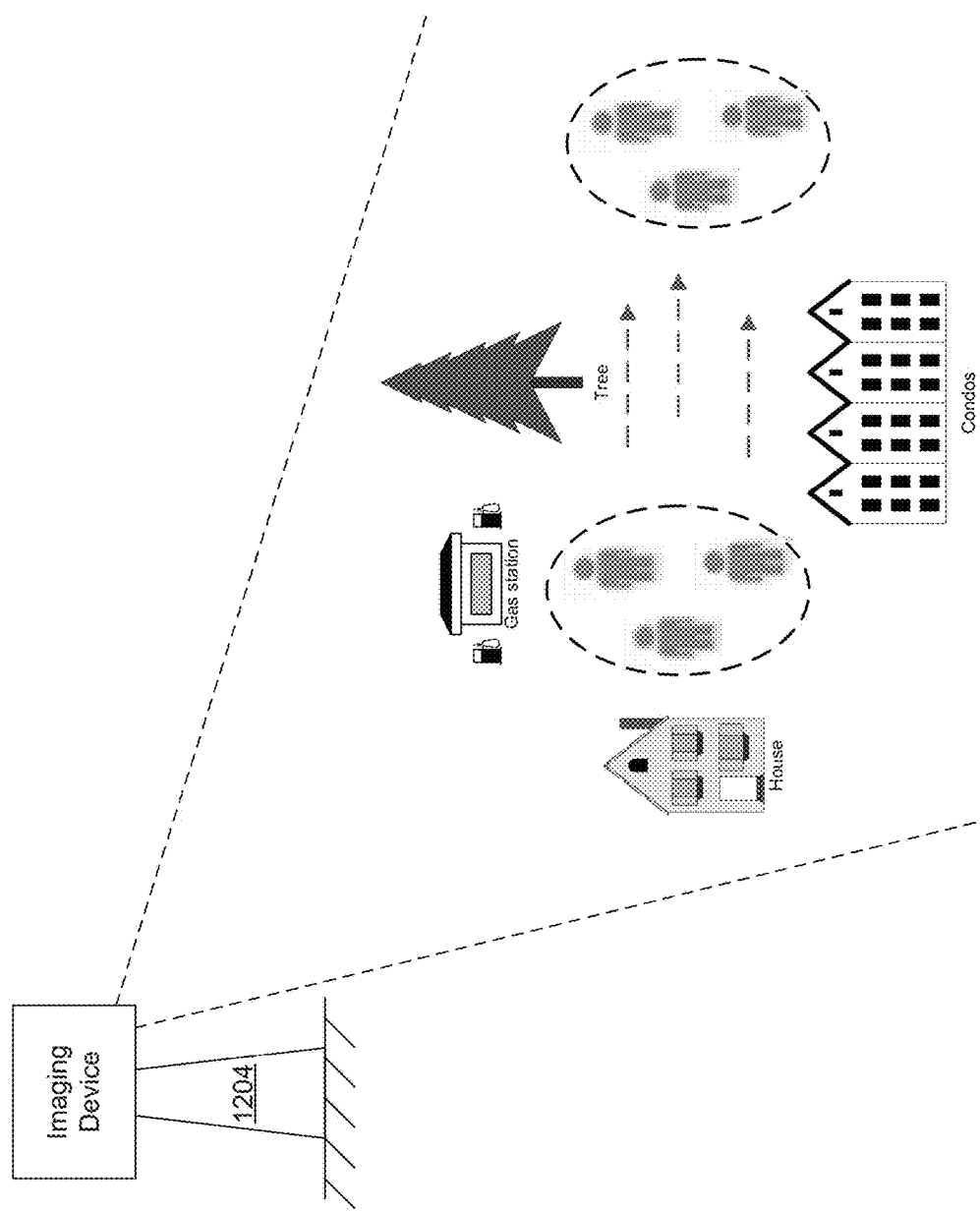

FIGS. 10, 11, 12, 13, and 14 illustrate the tracking/following of target objects by an imaging device, in accordance with different embodiments. In the examples of FIGS. 10, 11, 12, 13, and 14, the imaging device may be stationary, with the target objects and the background objects located in the field-of-view of the imaging device. If the imaging device is stationary, the background feature may not move at all. As shown in FIG. 10, the imaging device may be located directly above a central region comprising the target objects and the background objects. For example, the imaging device of FIG. 10 may be mounted on a UAV that is hovering at a fixed location directly above the target objects and the background objects. As shown in FIG. 11, the imaging device may be located above and at an angle relative to the target objects and the background objects. For example, the imaging device of FIG. 11 may be mounted on a UAV that is hovering at a fixed location above and at an angle relative to the target objects and the background objects. As shown in FIG. 12, the imaging device may be located on the ground at a distance from the target objects and the background objects. The imaging device of FIG. 12 may be mounted on a stationary structure 1204 such as a tower, a pole, a building, etc. In some embodiments, the imaging device of FIG. 12 may be mounted on an extension pole to which the imaging device is affixed. The extension pole may be held by a user or planted at a fixed location. In some embodiments, the imaging device may be capable of rotating about a fixed point (e.g., a security camera).

Figure 13:
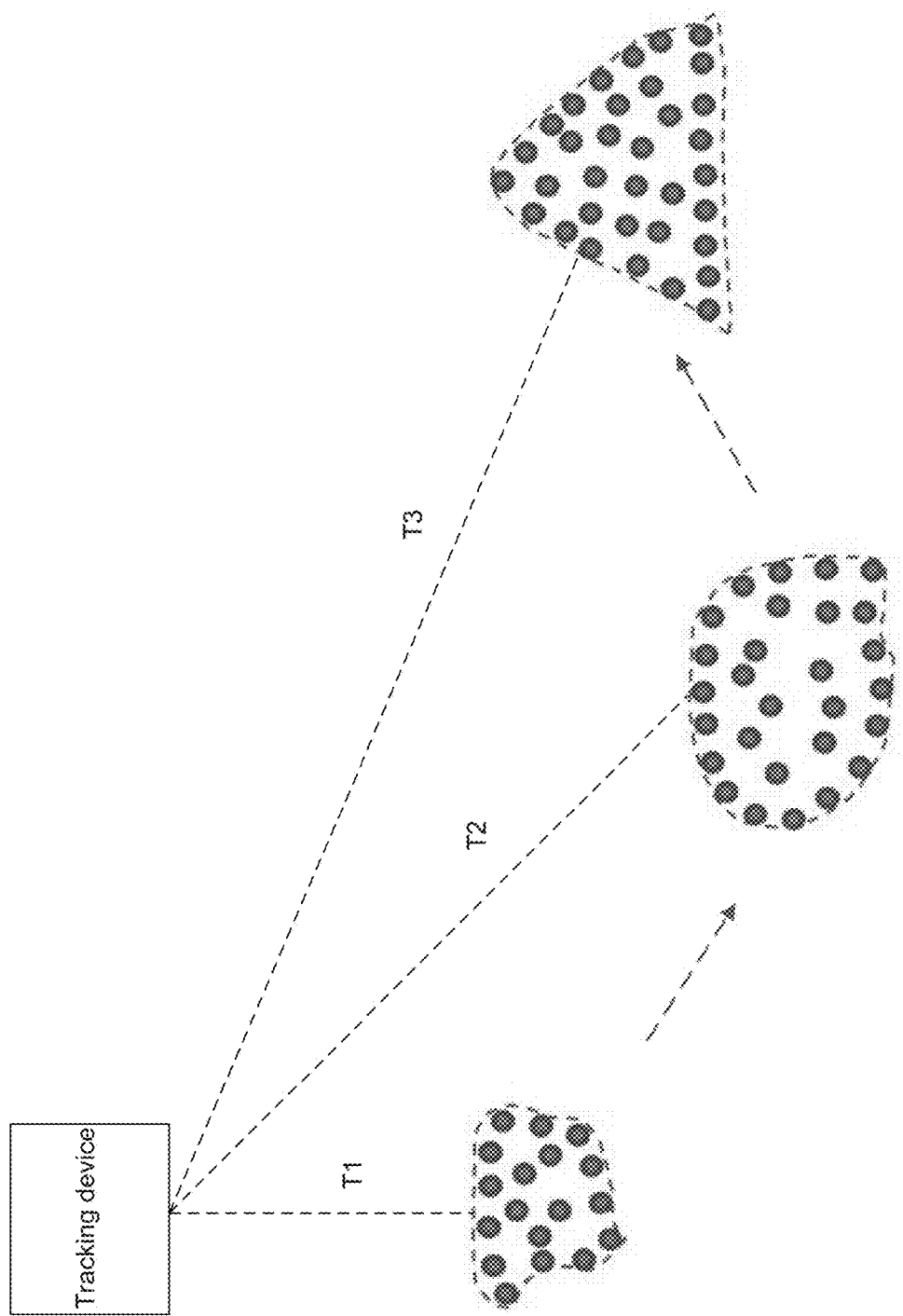
FIGS. 13 and 14 illustrate the tracking of target objects by an imaging device whereby a size and/or shape of a contour surrounding a tracking feature changes as the target objects move from one location to another, in accordance with different embodiments.
Figure 14:
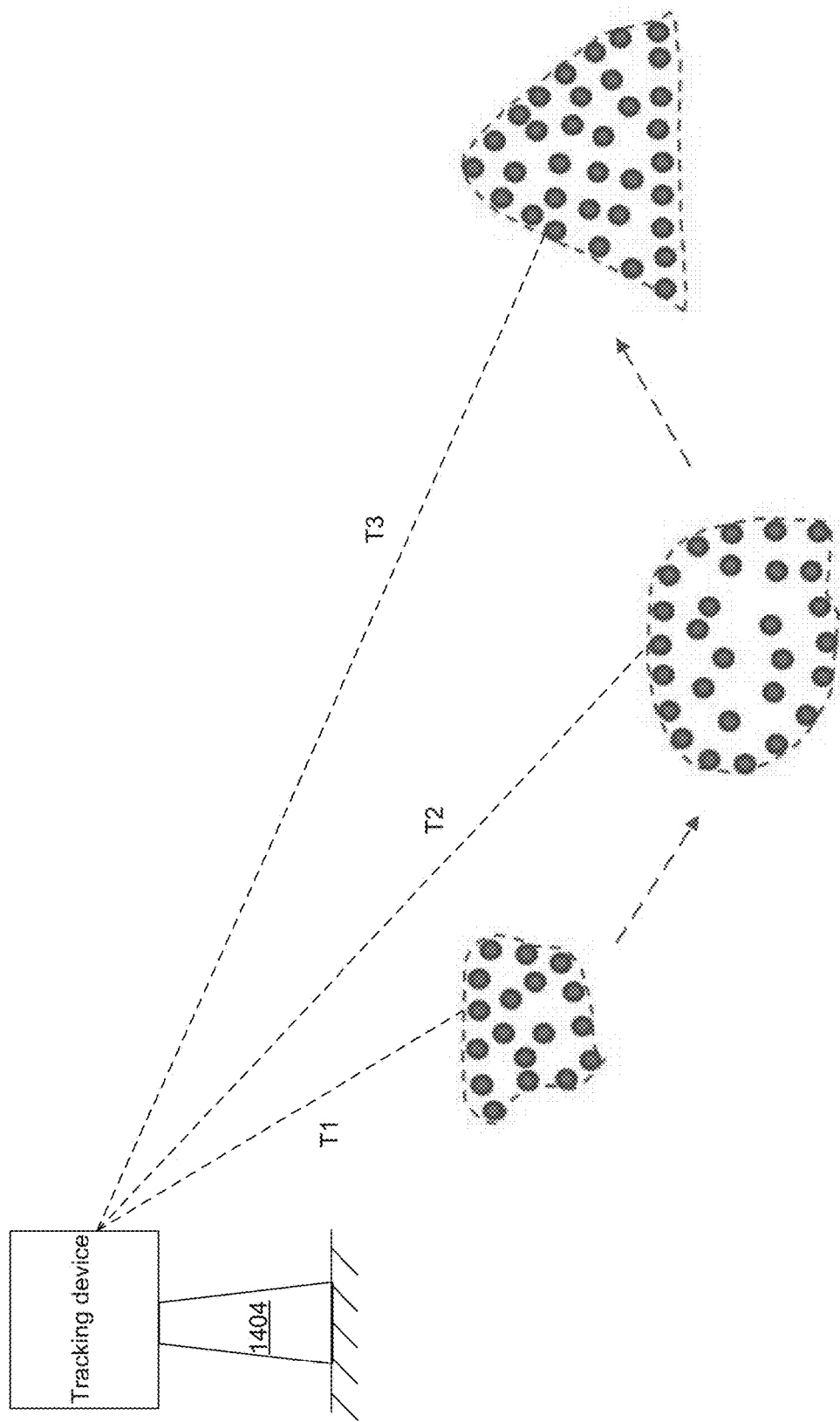

In the examples of FIGS. 10, 11, and 12, a contour surrounding the tracking feature in an image frame may remain relatively constant as the target objects move from one location to another. In contrast, in the examples of FIGS. 13 and 14, a contour surrounding the tracking feature may change as the target objects move from one location to another. For example, as shown in FIGS. 13 and 14, the size and shape of a contour surrounding the tracking feature may change as the target objects move from a first location at time T1 to a second location at time T2 and to a third location at time T3. In the example of FIG. 13, the imaging device may be may be mounted on a UAV that is hovering at a fixed location above and at an angle relative to the target objects and the background objects. In contrast, in the example of FIG. 14, the imaging device may be mounted on a stationary structure 1404 such as a tower, a pole, a building, etc. In some embodiments, the imaging device of FIG. 14 may be mounted on an extension pole to which the imaging device is affixed. The extension pole may be held by a user or planted at a fixed location.

In the examples of FIGS. 10, 11, 12, 13, and 14, the imaging device can be used to track the target objects. The image analyzer may be configured to identify the tracking feature (target objects) relative to the background feature (background objects) in the image frames, as previously described. After the tracking feature and the background feature have been identified, the target objects can be tracked as they move from one location to another location, based on the real-time movement characteristics of the pixels (or feature points) between image frames. In some embodiments, the image analyzer may be configured to track the target objects as the move from one location to another location. In other embodiments, a tracking device may be configured to track the target objects, based on the tracking feature and background feature that have been identified in the image frames by the image analyzer.

Figure 15:
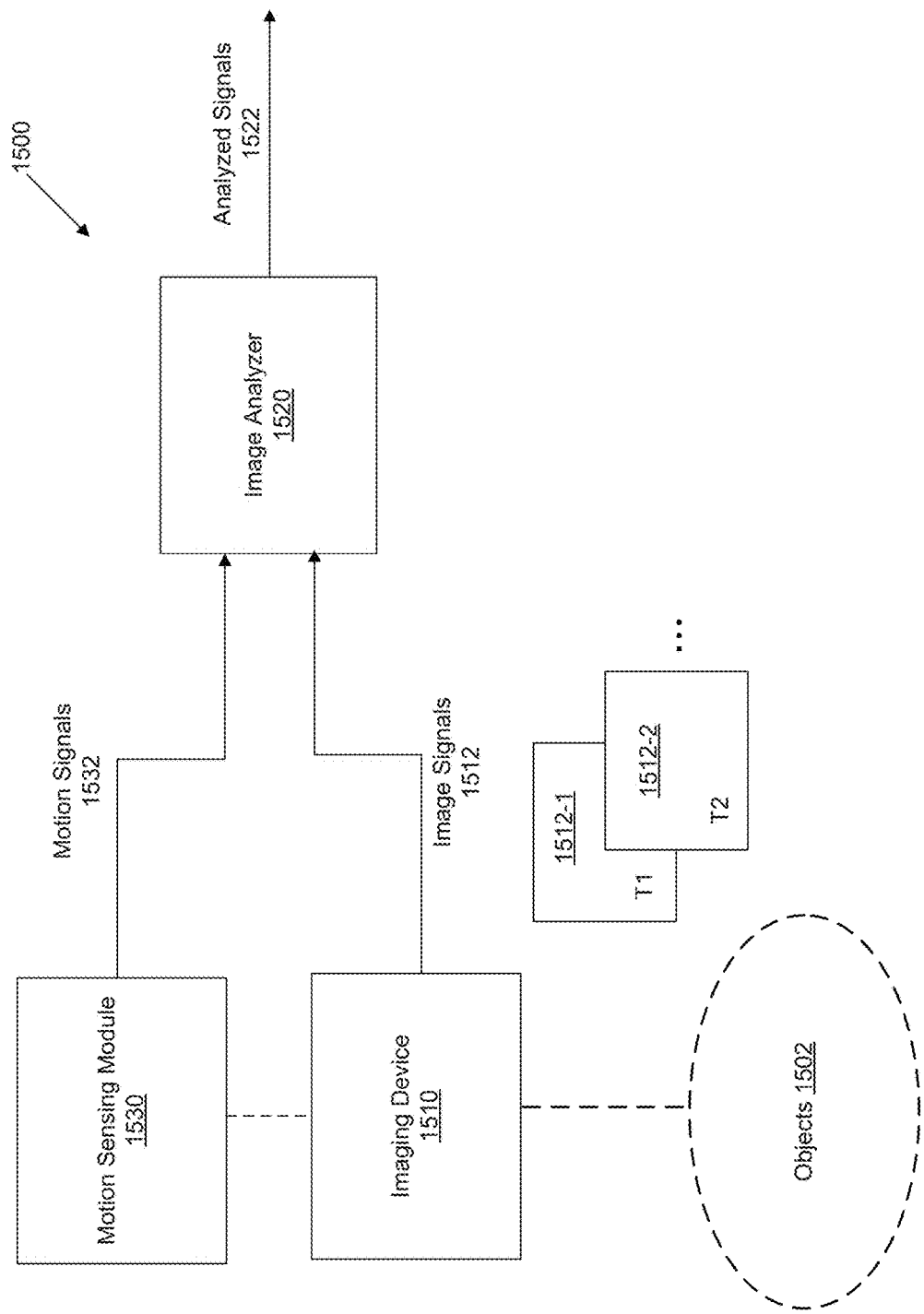
FIG. 15 illustrates a visual tracking system comprising an image analyzer for computing movement characteristics of a plurality of pixels based on motion characteristics of an imaging device, in accordance with some embodiments.

In some embodiments, the optical flow algorithm described in FIGS. 1-14 may be implemented on a mobile platform. FIG. 15 illustrates an example of a mobile platform that may also serve as a visual tracking system. Specifically, FIG. 15 illustrates a visual tracking system 1500 comprising an image analyzer for computing movement characteristics of a plurality of pixels based on motion characteristics of an imaging device, in accordance with some embodiments. In the embodiment of FIG. 15, an imaging device 1510 may be capable of motion. For example, the imaging device may be mounted or supported on a UAV. The visual tracking system may further comprise a motion sensing module 1530 configured to sense motion of the imaging device, and to provide motion signals 1532 to image analyzer 1520. The motion signals may include motion characteristics of the imaging device.

In the example of FIG. 15, the image analyzer may be configured to support visual tracking of one or more target objects. The imaging device may be configured to capture image frames of objects 1502. The image analyzer may be configured to receive a plurality of image signals 1512 from the imaging device. The image signals may be indicative of a plurality of image frames (e.g. a first image frame 1512-1 and a second image frame 1512-2) captured by the imaging device over a period of time (e.g., at times T1 and T2, respectively) while the imaging device is in motion. Each image frame may comprise a plurality of pixels. The image analyzer may be further configured to obtain the motion characteristics of the imaging device based on the plurality of motion signals, and to analyze the plurality of image signals based on the motion characteristics of the imaging device, so as to compute movement characteristics associated with the plurality of pixels. The computed movement characteristics may be encoded in analyzed signals 1522 that are output from the image analyzer. The aforementioned steps can be implemented using an optical flow algorithm, and will be described in further detail with reference to FIG. 16. Specifically, FIG. 16 illustrates the computation of movement characteristics of a plurality of pixels in exemplary images using the image analyzer of FIG. 15, in accordance with some embodiments.

Figure 16:
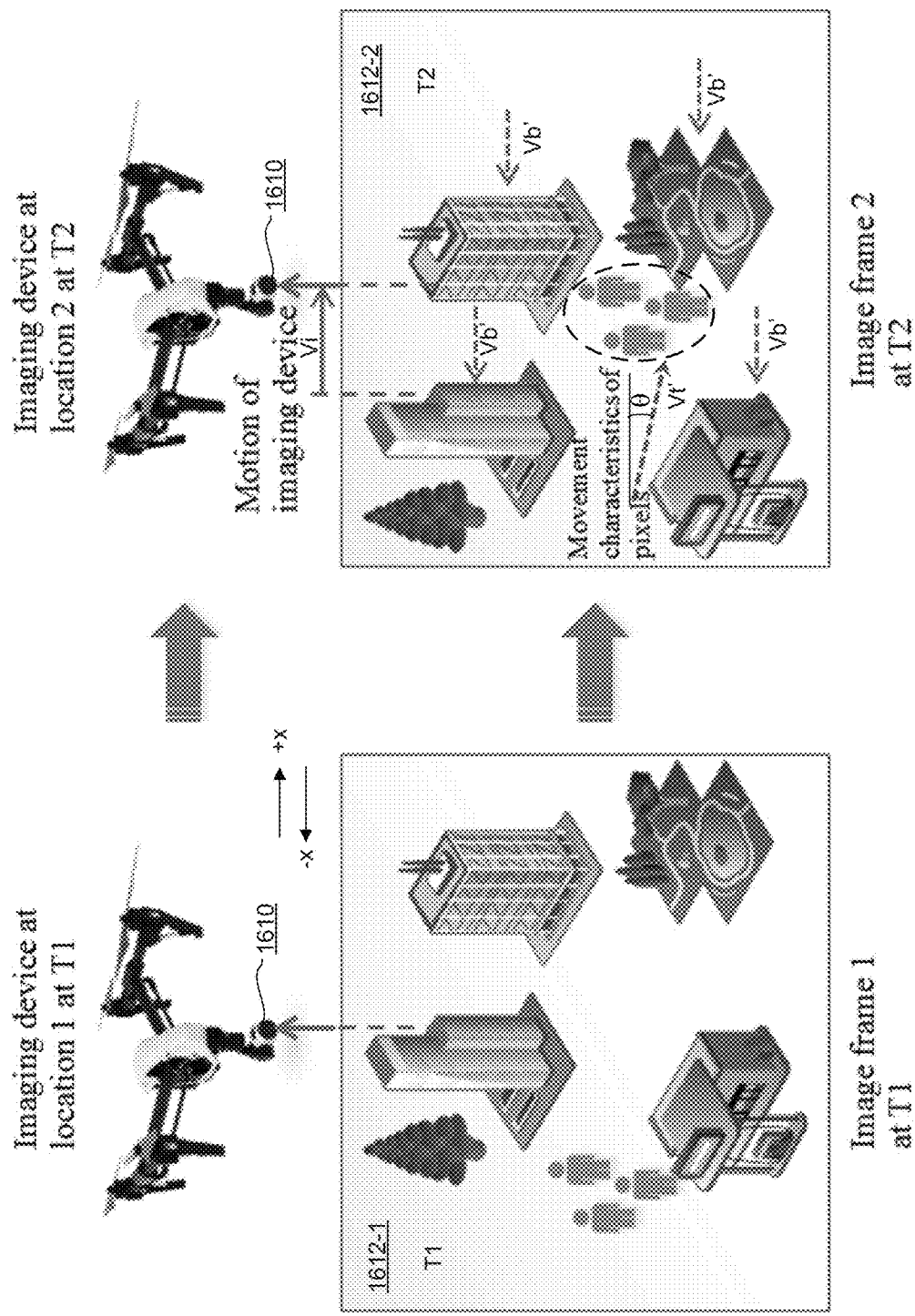
FIG. 16 illustrates an example of computation of movement characteristics of a plurality of pixels in a sequence of exemplary image frames using the image analyzer of FIG. 15, in accordance with some embodiments.

Referring to FIG. 16, an image analyzer (e.g., image analyzer 1520 of FIG. 15) may receive a plurality of image signals from an imaging device 1610. The image signals may comprise a first image frame 1612-1 captured at time T1 at location 1 and a second image frame 1612-2 captured at time T2 at location 2, whereby time T2 may be a point in time occurring after time T1, and locations 1 and 2 are different locations each having a unique set of spatial coordinates. Although FIG. 16 depicts two image frames, any number of images frames may be contemplated. For example, in some embodiments, the image signals may comprise a plurality of image frames 1612-1 to 1612-*n* captured over a period of time starting from T1 to Tn at respective locations 1 to m, where m and n may be any integer greater than 1.

In some embodiments, more than one image frame may be captured at a particular time instance. For example, the image signals may comprise a plurality of image frames 1612-1 captured at time T1, a plurality of image frames 1612-2 captured at time T2, and so forth. The plurality of image frames at each time instance may be averaged and transformed into a single image frame associated with that particular time instance. In some embodiments, a greater number of image frames may be captured when the target object and imaging device are moving quickly, and few number of image frames may be captured while the target object and/or the imaging device are moving slowly.

Each image frame may comprise a plurality of pixels that are associated with a plurality of feature points. As shown in FIG. 16, the feature points may be associated with target objects (e.g., a group of people) and background objects (e.g., buildings, trees, golf course, gas station, etc.). In the example of FIG. 16, the target objects may be located at a first position at time T1 (see first image frame 1612-1) and moved to a second position at time T2 (see second image frame 1612-2).

The plurality of pixels may be associated with a plurality of feature points. The image analyzer may be configured to analyze the plurality of image signals based on the motion characteristics of the imaging device. For example, the image analyzer may be configured to correlate the plurality of image frames to one another based on the motion characteristics of the imaging device. The image analyzer may be further configured to identify at least one tracking feature relative to at least one background feature based on the movement characteristics associated with the plurality of pixels.

For example, referring to FIG. 16, the imaging device may move along the positive (+) x-axis direction with speed Vi from location 1 to location 2. Accordingly, the background feature in the image frames will translate along the negative (−) x-axis direction with speed Vb', since the imaging device is moving relative to the stationary background objects. Speed Vb' may be proportional to speed Vi by a scaling constant, depending on a distance of the imaging device to each background object, the amount of distance traveled by the imaging device, and the field-of-view of the imaging device. Accordingly, the speed Vb' at which the background feature translate across the image frames may be a function of the speed Vi at which imaging device moves in 3-dimensional space. Subsequently, the image analyzer can identify the background features, by identifying feature points that move across the image frames at a speed Vb' that is scaled in proportion to the speed Vi and that is opposite to the direction in which the imaging device travels.

Since the target objects are moving relative to the stationary background objects, the tracking feature associated with the target objects will move at a velocity different from that of the background feature. This difference in movement between the target feature and the background feature is depicted in the image frames. In the example of FIG. 16, the target objects may move at a speed Vt in a direction different from that of the imaging device. When the motion of the target objects is captured in the image frames, the tracking feature may be observed to move at a speed Vt' at an angle θ relative to the positive x-axis direction. Accordingly, the image analyzer can identify the target feature, by identifying features points that move across image frames with a speed/direction that is different from those feature points associated with the background feature.

The background feature may be associated with a first set of pixels having substantially a first movement characteristic, and the tracking feature may be associated with a second set of pixels having substantially a second movement characteristic. The movement characteristics associated with the plurality of pixels may comprise at least one of a velocity and an acceleration of each pixel as measured across the plurality of image frames. The velocity of each pixel may further comprise a linear (translational) velocity and/or an angular velocity of each pixel. The linear velocity of each pixel may comprise a linear direction and a linear speed of each pixel.

The motion characteristics of the imaging device may comprise at least one of an attitude, an instantaneous position, a velocity, and an acceleration of the imaging device. The velocity of the imaging device may further comprise a linear velocity and/or an angular velocity of the imaging device. The linear velocity of the imaging device may comprise a linear direction and a linear speed of the imaging device. The first linear direction of the first set of pixels may be associated with the linear direction of the imaging device. The first linear speed of the first set of pixels (associated with the background feature) may be proportional to the linear speed of the imaging device by a speed constant. The angular velocity of the imaging device may comprise a rotational direction and a rotational speed of the imaging device. A curvilinear direction of the first set of pixels may be associated with the rotational direction of the imaging device. The curvilinear direction of the first set of pixels may be proportional to the rotational speed of the imaging device by a speed constant. The acceleration of the imaging device may further comprise a linear acceleration and/or an angular acceleration of the imaging device. The linear acceleration of the first set of pixels may be associated with the linear acceleration of the imaging device. The angular acceleration of the first set of pixels may be associated with the angular acceleration of the imaging device.

In some embodiments, the instantaneous position of the imaging device may be determined using a range-finding and/or locating device. The range-finding and/or locating device may be a Global Positioning System (GPS) device. In some embodiments, the range-finding and/or locating device may be a time-of-flight camera that is capable of measuring distances between the imaging device and the target objects/background objects. The instantaneous position of the imaging device may be determined relative to physical locations of the background objects. In some embodiments, the image analyzer may be configured to calculate a scaling factor based on the instantaneous position of the imaging device and the physical locations of the background objects. In some embodiments, the image analyzer may be further configured to compute the movement characteristic of each pixel using the motion characteristics of the imaging device and the scaling factor. In some embodiments, the motion characteristics of the imaging device may be determined using sensors such as location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones), and/or field sensors (e.g., magnetometers, electromagnetic sensors).

Figure 17:
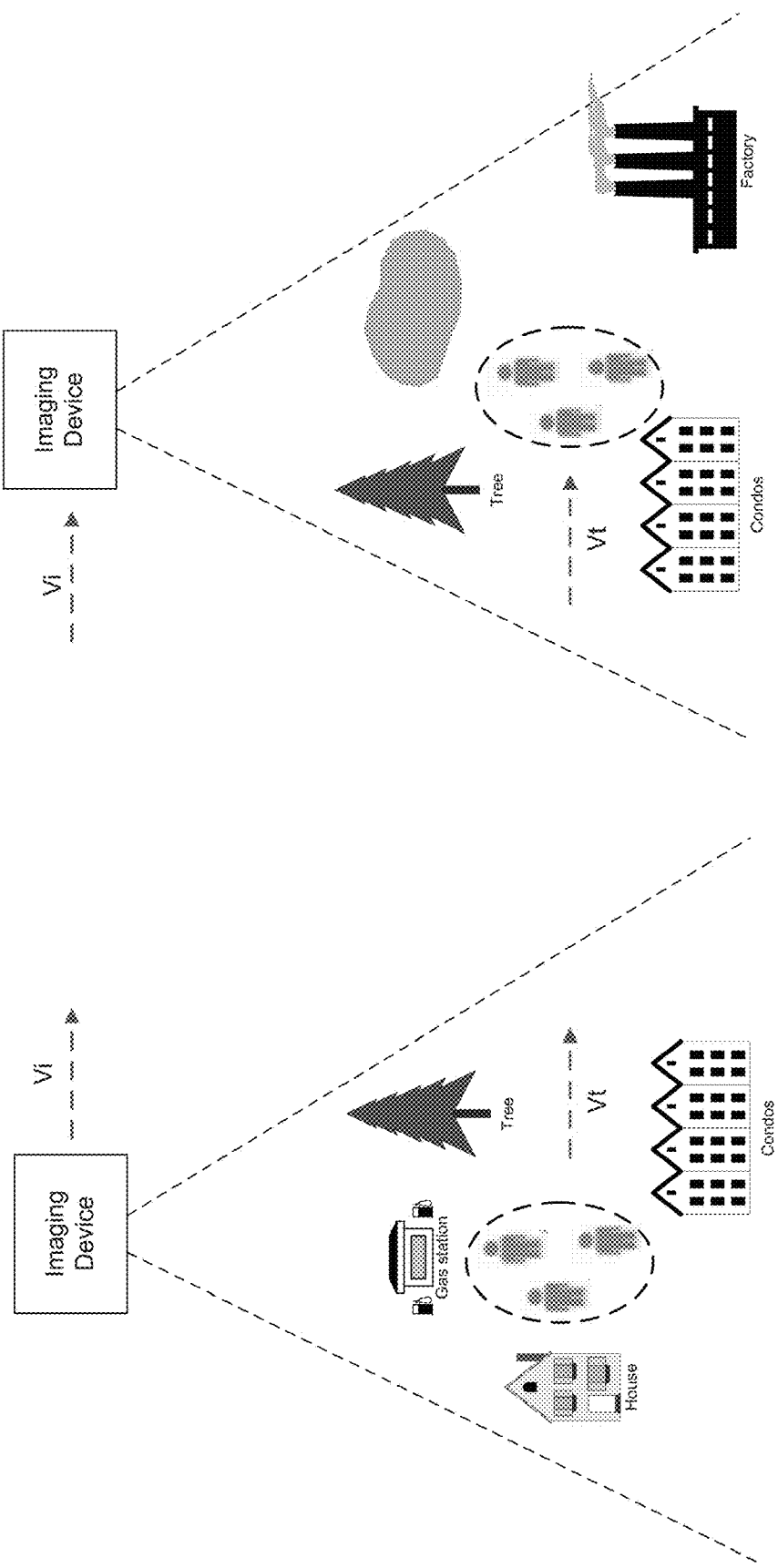
Figure 18:
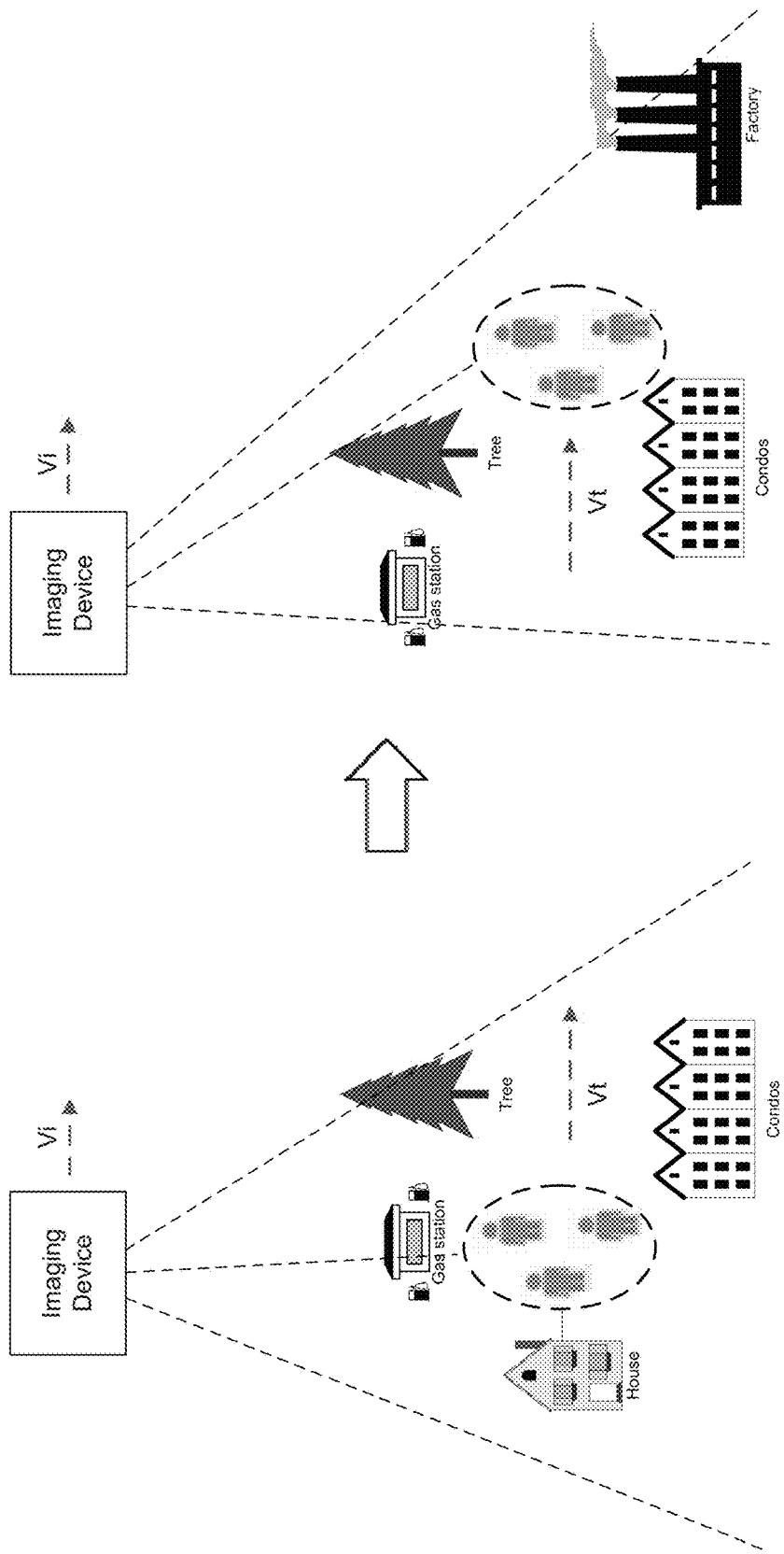

Based on the motion characteristics of the imaging device, and the movement characteristics of the background feature and target feature, the image analyzer can determine the movement of the target objects relative to the background objects and the imaging device. For example, the image analyzer can detect the directions and speeds at which the target objects are moving relative to the background objects and the imaging device. FIGS. 17, 18, and 19 illustrate different embodiments in which an imaging device is tracking a group of target objects. Specifically, FIG. 17 illustrates a visual tracking system 1700 in which an imaging device is moving at speed Vi and the target objects are moving at speed Vt in substantially a same direction, where Vi is substantially the same as Vt (Vi≅Vt).

Figure 20:
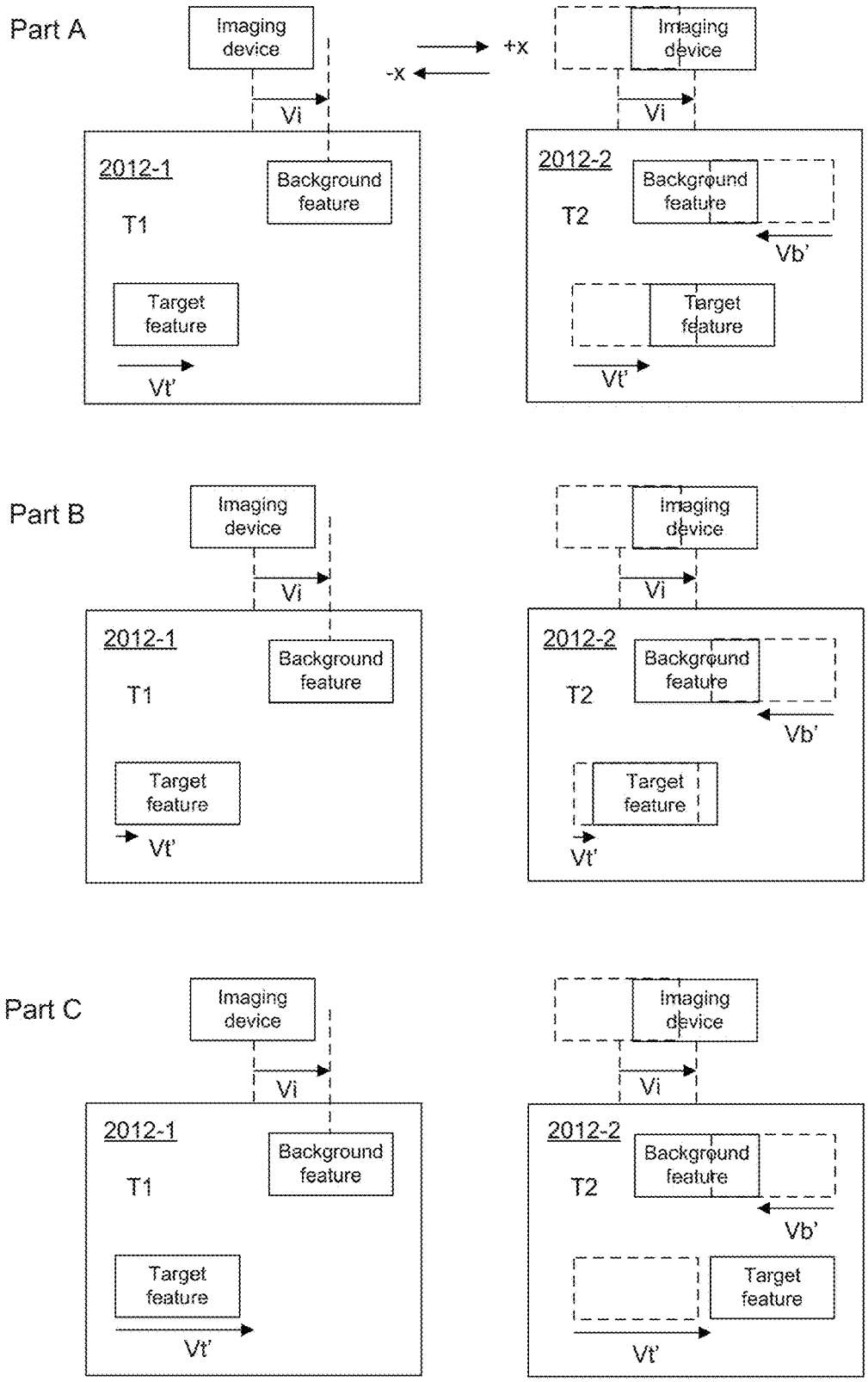
FIG. 20 illustrates exemplary movements of a background feature and a tracking feature in a sequence of exemplary image frames, in accordance with some embodiments.

FIGS. 18 and 19 illustrate embodiments in which the target objects and the imaging device may be moving in a substantially same direction but at different speeds. In visual tracking system 1800 of FIG. 18, the imaging device may be moving slower than the target objects. For example, the imaging device may be moving at speed Vi and the target objects may be moving at speed Vt, where Vi may be less than Vt (Vi<Vt). Conversely, in visual tracking system 1900 of FIG. 19, the imaging device may be moving faster than the target objects. For example, the imaging device may be moving at speed Vi and the target objects may be moving at speed Vt, where Vi may be greater than Vt (Vi>Vt). The different embodiments depicted in FIGS. 17, 18, and 19 may be depicted schematically in FIG. 20. Each part in FIG. 20 may correspond to different relative movement between the imaging device and the target objects. For example, FIG. 20 (Part A) may correspond to the embodiment in FIG. 17; FIG. 20 (Part B) may correspond to the embodiment in FIG. 18; and FIG. 20 (Part C) may correspond to the embodiment in FIG. 19.

Referring to FIG. 20 (Part A), an imaging device may capture a first image frame 2012-1 at time T1 and a second image frame 2012-2 at time T2. The imaging device and the target objects may move at substantially a same speed in a substantially same direction. For example, the imaging device may move at a speed Vi and the target objects may move at a speed Vt along the positive x-axis direction, whereby Vi and Vt may be substantially the same (Vi≅Vt). As previously described, the speed Vb' at which the background feature translates across the image frames may be a function of the speed Vi at which the imaging device moves in a 3-dimensional space (in this case, along the positive x-axis direction). The speed Vt' at which the target feature translates across the image frames may be a function of the speed Vt at which the target objects move in a 3-dimensional space (in this case, also along the positive x-axis direction). Since the imaging device is moving relative to the background objects, the background feature in the image frames may translate at speed Vb' in the opposite direction in which the imaging device is moving, as shown in FIG. 20 (Part A). The background feature and target feature may translate at substantially a same speed (Vb'≅Vt') and by a same distance between the first and second image frames, but in opposite directions to each other. Based on the movement characteristics of the feature points in FIG. 20 (Part A), the image analyzer can determine that the imaging device and the target objects are moving at substantially a same speed in a substantially same direction.

In some embodiments, the imaging device and the target objects may move in substantially a same direction but at different speeds. For example, referring to FIG. 20 (Part B), the imaging device may move faster than the target objects. Specifically, the imaging device may move at a speed Vi and the target objects may move at a speed Vt along the positive x-axis direction, whereby Vi is greater than Vt (Vi>Vt). Accordingly, the background feature may translate at speed Vb' in the negative x-axis direction between the first and second image frames, and the target feature may translate at speed Vt' in the positive x-axis direction between the first and second image frames, where Vt'<Vb'. Based on the movement characteristics of the feature points in FIG. 20 (Part B), the image analyzer can determine that the imaging device and the target objects are moving in substantially a same direction, and that the target objects are moving slower than the imaging device.

In some cases, for example referring to FIG. 20 (Part C), the imaging device may be moving slower than the target objects. Specifically, the imaging device may move at a speed Vi and the target objects may move at a speed Vt along the positive x-axis direction, whereby Vi is less than Vt (Vi<Vt). Accordingly, the background feature may translate at speed Vb' in the negative x-axis direction between the first and second image frames, and the target feature may translate at speed Vt' in the positive x-axis direction between the first and second image frames, where Vt'>Vb'. Based on the movement characteristics of the feature points in FIG. 20 (Part C), the image analyzer can determine that the imaging device and the target objects are moving in substantially a same direction, and that the target objects are moving faster than the imaging device.

In some embodiments, the image analyzer can detect that the target objects may be stationary or at rest. For example, referring to FIG. 21 (Part A), the imaging device may capture a first image frame 2112-1 at time T1 and a second image frame 2112-2 at time T2. The imaging device may move at a speed Vi along the positive x-axis direction. However, the target objects may be stationary or at rest. Accordingly, the background feature may translate at speed Vb' in the negative x-axis direction, and the target feature may translate at speed Vt' in the negative x-axis direction, whereby Vb' is substantially equal to Vt' (Vb'≅Vt'). Since the target feature and the background feature are moving in substantially a same direction at substantially a same speed, this means that there is no relative motion between the target objects and the background objects. Accordingly, based on the movement characteristics of the feature points in FIG. 21 (Part A), the image analyzer can determine that the target objects are stationary or at rest. The embodiment of FIG. 21 (Part A) may be based on an assumption that the target objects have been previously identified at some other time instance based on their movement relative to the background objects.

In the embodiment of FIG. 20, the imaging device and the target objects may be moving in substantially a same direction. In some instances, the imaging device and the target objects can also move in opposite directions, for example as illustrated in FIG. 21 (Parts B and C).

Figure 21:
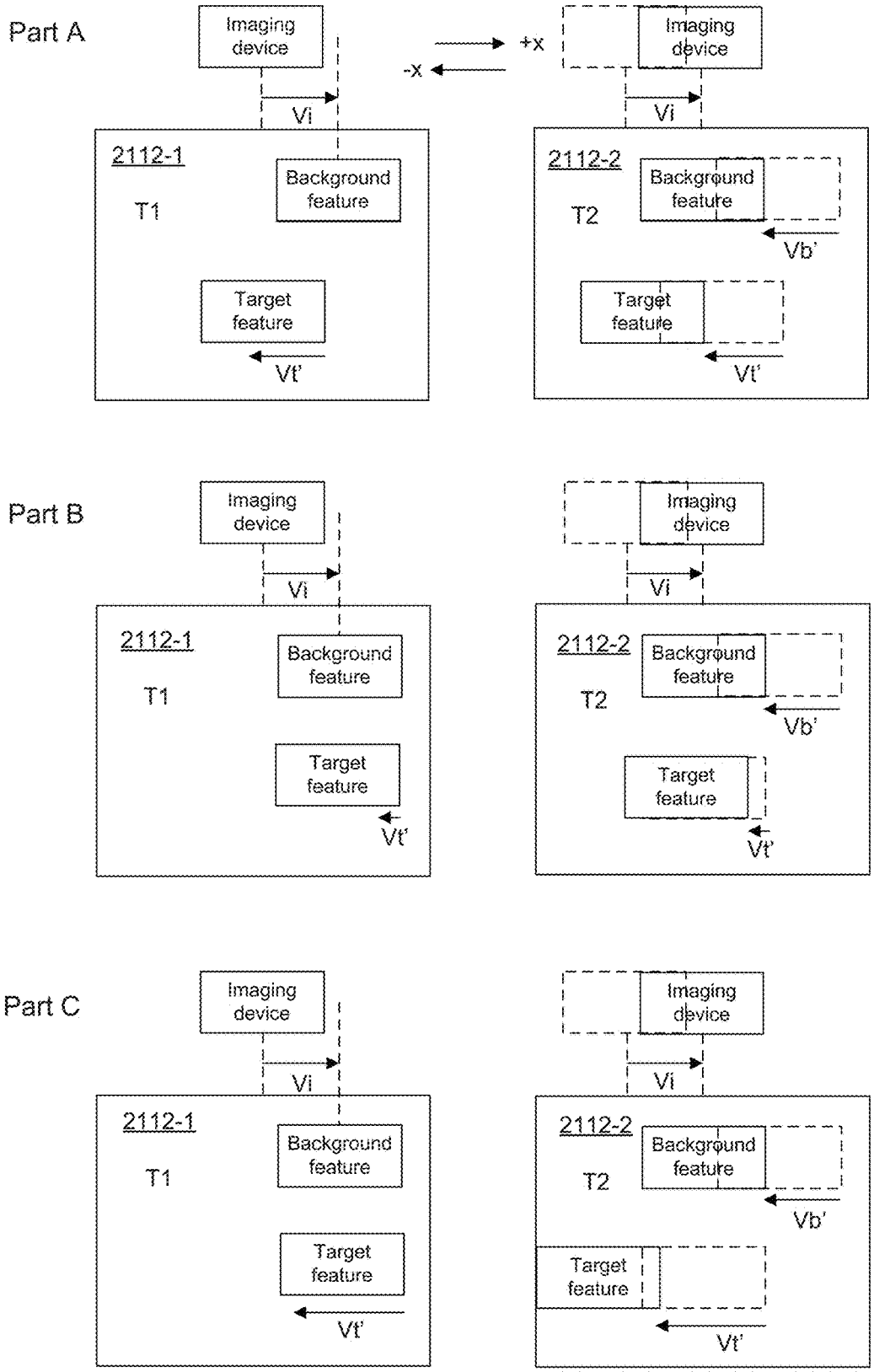
FIG. 21 illustrates exemplary movements of a background feature and a tracking feature in a sequence of exemplary image frames, in accordance with some other embodiments.

Referring to FIG. 21 (Part B), the imaging device may be moving faster than the target objects but in opposite directions. Specifically, the imaging device may move at a speed Vi along the positive x-axis direction and the target objects may move at a speed Vt along the negative x-axis direction, whereby Vi is greater than Vt (Vi>Vt). Accordingly, the background feature may translate at speed Vb' in the negative x-axis direction between the first and second image frames, and the target feature may translate at speed Vt' in the negative x-axis direction between the first and second image frames, where Vt'<Vb'. Based on the movement characteristics of the feature points in FIG. 21 (Part B), the image analyzer can determine that the imaging device and the target objects are moving in substantially opposite directions, and that the target objects are moving slower than the imaging device.

Likewise, referring to FIG. 21 (Part C), the imaging device may be moving slower than the target objects but in opposite directions. Specifically, the imaging device may move at a speed Vi along the positive x-axis direction and the target objects may move at a speed Vt along the negative x-axis direction, whereby Vi is less than Vt (Vi<Vt). Accordingly, the background feature may translate at speed Vb' in the negative x-axis direction between the first and second image frames, and the target feature may translate at speed Vt' in the negative x-axis direction between the first and second image frames, where Vt'>Vb'. Based on the movement characteristics of the feature points in FIG. 21 (Part C), the image analyzer can determine that the imaging device and the target objects are moving in substantially opposite directions, and that the target objects are moving faster than the imaging device.

Figure 22:
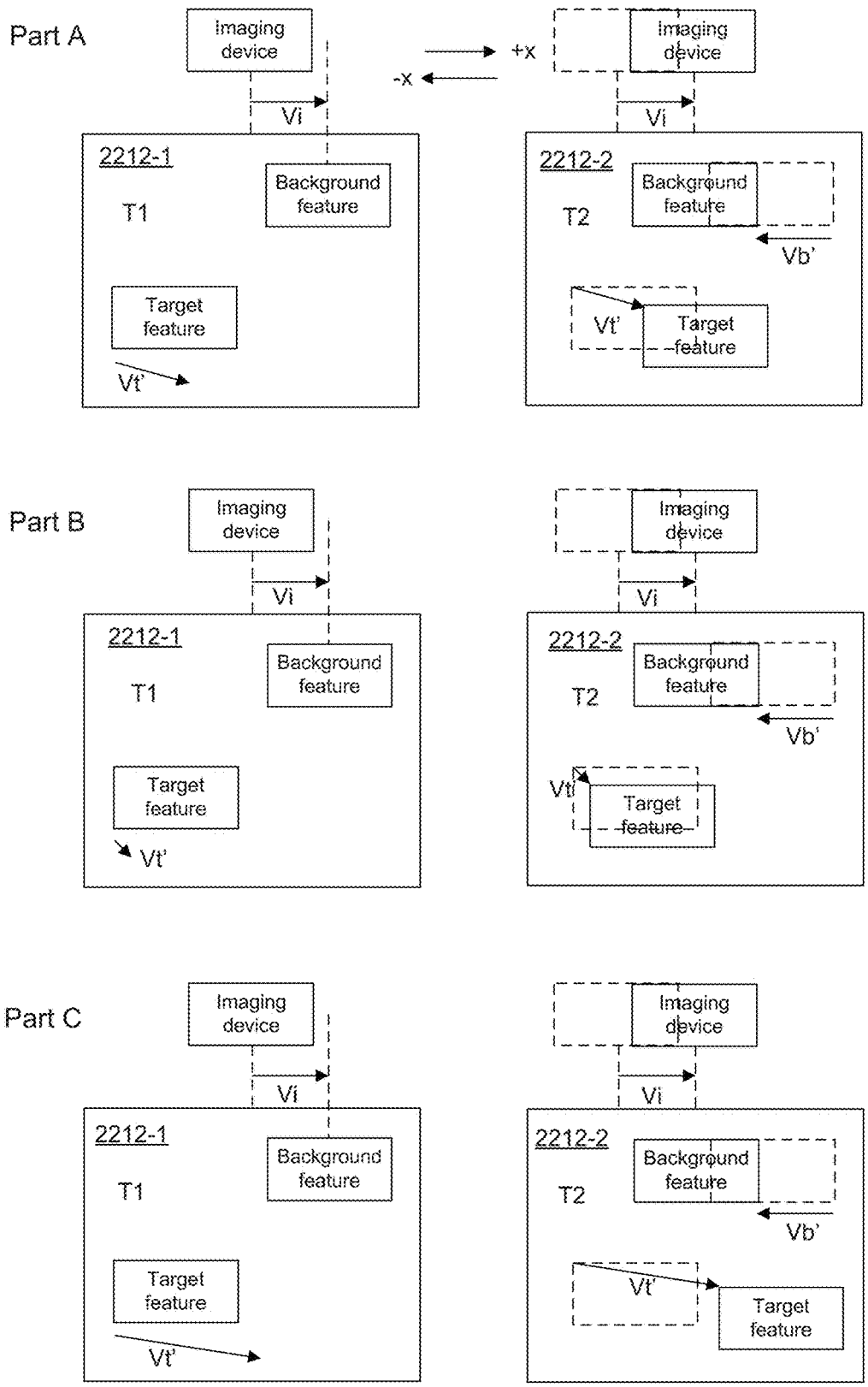
FIG. 22 illustrates exemplary movements of a background feature and a tracking feature in a sequence of exemplary image frames, in accordance with some further embodiments.

In some embodiments, the imaging device and the target objects may be moving in directions that are oblique to one another, as illustrated in FIG. 22.

For example, referring to FIG. 22 (Part A), the imaging device and the target objects may move at substantially a same speed in directions that are oblique to one another. For example, the imaging device may move at a speed Vi along the positive x-axis direction and the target objects may move at a speed Vt in a direction that is oblique to the positive x-axis direction. Vi and Vt may be substantially the same (Vi≅Vt). Accordingly, the background feature may translate at speed Vb' in the negative x-axis direction between the first and second image frames, and the target feature may translate at speed Vt' in an oblique direction between the first and second image frames, where Vt'≅Vb'. Based on the movement characteristics of the feature points in FIG. 22 (Part A), the image analyzer can determine that the imaging device and the target objects are moving in directions that are oblique to one another, and that the target objects and the imaging device are moving at substantially the same speed.

In some embodiments, the imaging device and the target objects may move in different directions and at different speeds. For example, in some instances, the imaging device and the target objects may move in directions that are oblique to one another, and the imaging device may move faster than the target objects. As shown in FIG. 22 (Part B), the imaging device may move at a speed Vi along the positive x-axis direction and the target objects may move at a speed Vt in a direction that is oblique to the positive x-axis direction. Vi may be greater than Vt (Vi>Vt). Accordingly, the background feature may translate at speed Vb' in the negative x-axis direction between the first and second image frames, and the target feature may translate at speed Vt' in an oblique direction between the first and second image frames, where Vt'<Vb'. Based on the movement characteristics of the feature points in FIG. 22 (Part B), the image analyzer can determine that the imaging device and the target objects are moving in directions that are oblique to one another, and that the target objects are moving slower than the imaging device.

In some other instances, the imaging device and the target objects may move in directions that are oblique to one another, and the imaging device may be moving slower than the target objects. Referring to FIG. 22 (Part C), the imaging device may move at a speed Vi along the positive x-axis direction and the target objects may move at a speed Vt in a direction that is oblique to the positive x-axis direction. Vi may be less than Vt (Vi<Vt). Accordingly, the background feature may translate at speed Vb' in the negative x-axis direction between the first and second image frames, and the target feature may translate at speed Vt' in an oblique direction between the first and second image frames, where Vt'>Vb'. Based on the movement characteristics of the feature points in FIG. 22 (Part C), the image analyzer can determine that the imaging device and the target objects are moving in directions that are oblique to one another, and that the target objects are moving faster than the imaging device.

As previously described, the imaging device and the target objects may move in different directions. The different directions may include directions that are parallel to one another, oblique to one another, that form an acute angle with one another, or that form an obtuse angle with one another. In some instances, the different directions may include directions that are perpendicular to one another. Any orientation of the moving directions of the imaging device and the target objects may be contemplated.

In the embodiments of FIGS. 20, 21, and 22, the imaging devices and the target objects move linearly, which result in a translation of the background feature and the target feature between image frames. In some embodiments, the imaging devices and/or the target objects may have non-linear motion characteristics. For example, the imaging devices and/or the target objects may move in a curvilinear manner along an arc, which may result in a rotation of the background feature and/or the target feature between image frames.

Figure 23:
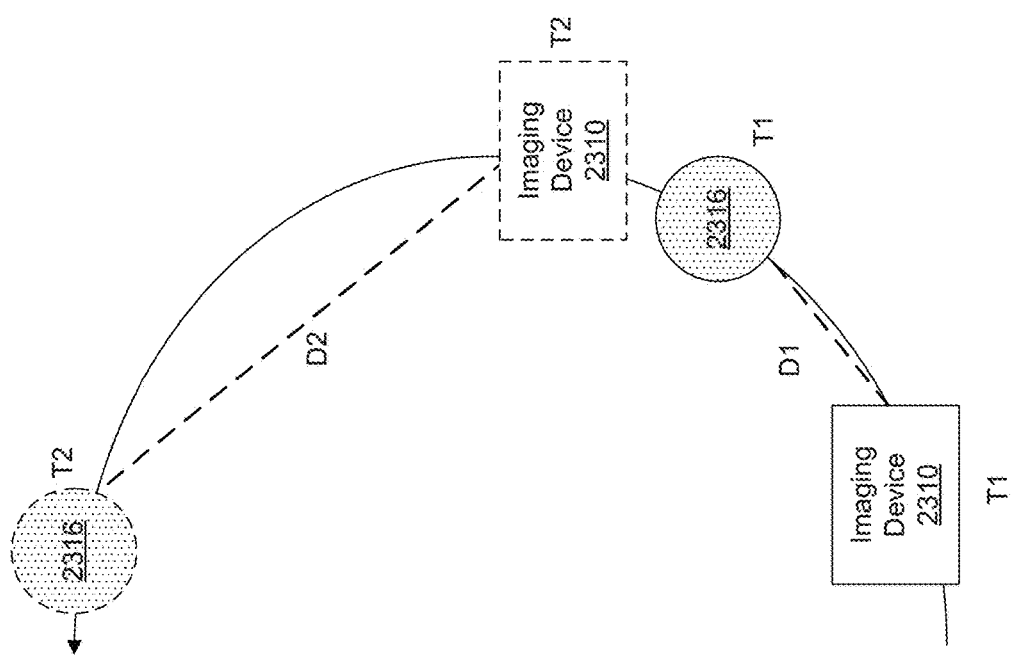
FIG. 23 illustrates an imaging device tracking a target object in a curvilinear manner along an arc, in accordance with some embodiments.

FIG. 23 illustrates an embodiment in which an imaging device 2310 is tracking a target object 2316 in a curvilinear manner along an arc. The imaging device and the target object may move at different speeds along the arc. For example, at time T1, the imaging device and the target object may be in a first location and separated by a distance D1. At time T2, the imaging device and the target object may be in a second location and separated by a distance D2, where D2 is greater than D1. In other words, an angular speed of the target object may be greater than an angular speed of the imaging device between times T1 to T2. The image analyzer may be configured to analyze the non-linear motion characteristics of features in the image frames, as described with reference to FIGS. 24 and 25.

Figure 24:
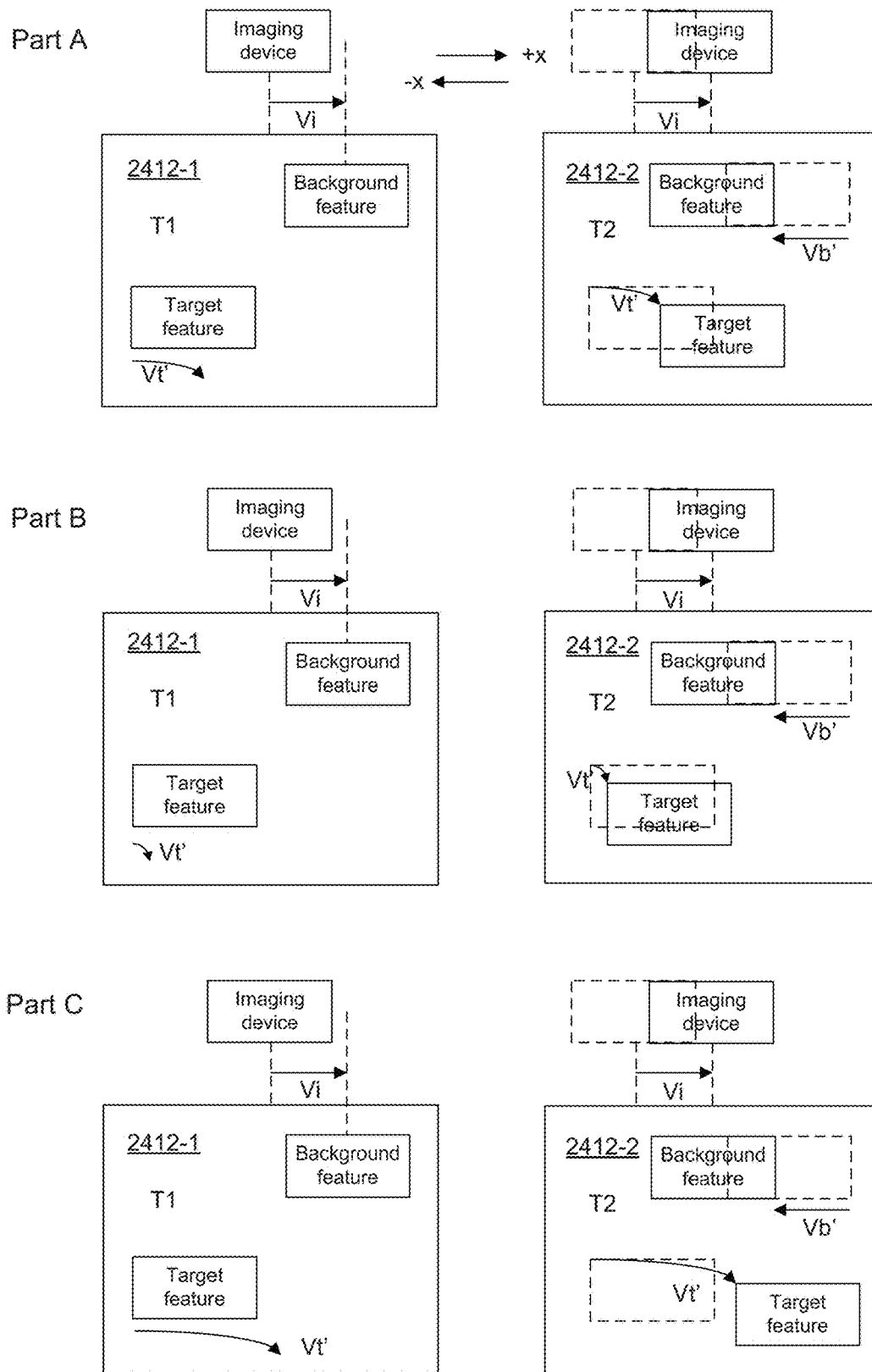
FIG. 24 illustrates exemplary movements of a background feature and a tracking feature in a sequence of exemplary image frames, in accordance with some additional embodiments.

In the embodiment of FIG. 24, the imaging device may be moving in a linear direction and the target objects may be moving in a curvilinear direction.

For example, referring to FIG. 24 (Part A), the imaging device may move at a speed Vi along the positive x-axis direction and the target objects may move at a speed Vt in a curvilinear direction. The speed Vt may correspond to a linear speed, and may be calculated using Vt=R·ω, where R is the radius of an arc (circle) in the curvilinear direction and ω is the angular speed of the target objects. In the embodiment of FIG. 24 (Part A), Vi and Vt may be substantially the same (Vi≅Vt). Accordingly, the background feature may translate at speed Vb' in the negative x-axis direction between the first and second image frames, and the target feature may translate at speed Vt' in a curvilinear direction between the first and second image frames, where Vt'≅Vb'. Based on the movement characteristics of the feature points in FIG. 24 (Part A), the image analyzer can determine that the imaging device is moving in a linear direction, that the target objects are moving in a curvilinear direction, and that the target objects and the imaging device are moving at substantially the same speed.

In some embodiments, the imaging device may move in a linear direction, the target objects may move in a curvilinear direction, and the imaging device and the target objects may move at different speeds. For example, referring to FIG. 24 (Part B), the imaging device may move at a speed Vi along the positive x-axis direction and the target objects may move at a speed Vt in a curvilinear direction. Vi may be greater than Vt (Vi>Vt). Accordingly, the background feature may translate at speed Vb' in the negative x-axis direction between the first and second image frames, and the target feature may translate at speed Vt' in a curvilinear direction between the first and second image frames, where Vt'<Vb'. Based on the movement characteristics of the feature points in FIG. 24 (Part B), the image analyzer can determine that the imaging device is moving in a linear direction, that the target objects are moving in a curvilinear direction, and that the target objects are moving slower than the imaging device.

In the example shown in FIG. 24 (Part C), the imaging device may move at a speed Vi along the positive x-axis direction and the target objects may move at a speed Vt in a curvilinear direction. Vi may be less than Vt (Vi<Vt). Accordingly, the background feature may translate at speed Vb' in the negative x-axis direction between the first and second image frames, and the target feature may translate at speed Vt' in a curvilinear direction between the first and second image frames, where Vt'>Vb'. Based on the movement characteristics of the feature points in FIG. 24 (Part C), the image analyzer can determine that the imaging device is moving in a linear direction, that the target objects are moving in a curvilinear direction, and that the target objects are moving faster than the imaging device.

Figure 25:
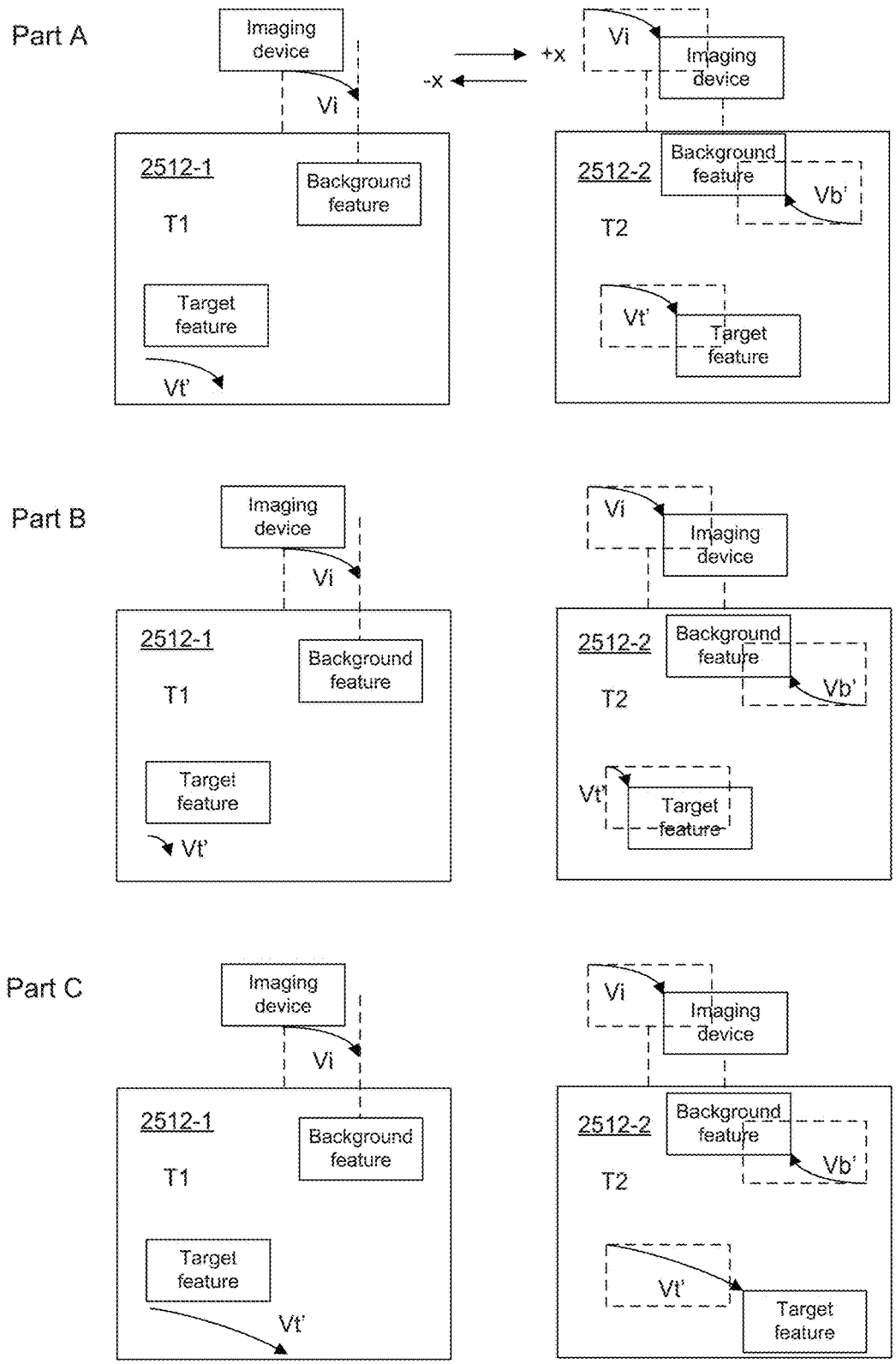
FIG. 25 illustrates exemplary movement of a background feature and a tracking feature in a sequence of exemplary image frames, in accordance with some more additional embodiments.

In some embodiments, both the imaging device and the target objects may be moving in a curvilinear direction, as shown in the embodiment of FIG. 25.

For example, referring to FIG. 25 (Part A), the imaging device may move at a speed Vi in a curvilinear direction and the target objects may move at a speed Vt in the same curvilinear direction. Vi and Vt may be substantially the same (Vi≅Vt). Accordingly, the background feature may move at speed Vb' in a curvilinear direction between the first and second image frames, and the target feature may translate at speed Vt' in a curvilinear direction between the first and second image frames, where Vt'≅Vb'. Based on the movement characteristics of the feature points in FIG. 25 (Part A), the image analyzer can determine that both the imaging device and the target objects are moving in a curvilinear direction, and that the target objects and the imaging device are moving at substantially the same speed.

In some embodiments, both the imaging device and the target objects may be moving in a curvilinear direction but at different speeds. For example, referring to FIG. 25 (Part B), the imaging device may move at a speed Vi in a curvilinear direction and the target objects may move at a speed Vt in a curvilinear direction. Vi may be greater than Vt (Vi>Vt). Accordingly, the background feature may translate at speed Vb' in a curvilinear direction between the first and second image frames, and the target feature may translate at speed Vt' in a curvilinear direction between the first and second image frames, where Vt'<Vb'. Based on the movement characteristics of the feature points in FIG. 25 (Part B), the image analyzer can determine that both the imaging device and the target objects are moving in a curvilinear direction, and that the target objects are moving slower than the imaging device.

In the example shown in FIG. 25 (Part C), the imaging device may move at a speed Vi in a curvilinear direction and the target objects may move at a speed Vt in a curvilinear direction. Vi may be less than Vt (Vi<Vt). Accordingly, the background feature may move at speed Vb' in a curvilinear between the first and second image frames, and the target feature may translate at speed Vt' in a curvilinear direction between the first and second image frames, where Vt'>Vb'. Based on the movement characteristics of the feature points in FIG. 25 (Part C), the image analyzer can determine that both the imaging device and the target objects are moving in a curvilinear direction, and that the target objects are moving faster than the imaging device.

In the embodiments of FIGS. 20, 21, and 22, a first movement characteristic of a first set of pixels (associated with the background feature) may comprise a first linear velocity comprising a first linear direction and a first linear speed. A second movement characteristic of a second set of pixels (associated with the target feature) may comprise a second linear velocity comprising a second linear direction and a second linear speed. In some embodiments, the image analyzer may be configured to determine that the target object is moving at a substantially same speed and direction as the imaging device, when the first linear direction is parallel to the second linear direction in opposite directions and when the first linear speed is the same as the second linear speed (see, e.g., FIG. 20A).

In some embodiments, the image analyzer may be configured to determine that the target object is moving in a substantially same direction as the imaging device and at a different speed from the imaging device, when the first linear direction is parallel to the second linear direction in opposite directions and when the first linear speed is different from the second linear speed (see, e.g., FIG. 20 (Parts B and C)). In those embodiments, the image analyzer may be configured to determine that the target object is moving faster than the imaging device when the first linear speed is less than the second linear speed (see, e.g., FIG. 20 (Part C)), or that the target object is moving slower than the imaging device when the first linear speed is greater than the second linear speed (see, e.g., FIG. 20 (Part B)).

In some embodiments, the image analyzer may be configured to determine that the target object is stationary or at rest, when the first linear direction is parallel to the second linear direction in a same direction and when the first linear speed is the same as the second linear speed (see, e.g., FIG. 21 (Part A)).

In some embodiments, the image analyzer may be configured to determine that the target object and the imaging device are moving in opposite directions at different speeds, when the first linear direction is parallel to the second linear direction in a same direction and when the first linear speed is different from the second linear speed (see, e.g., FIG. 21 (Part B and C)). In those embodiments, the image analyzer may be configured to determine that the target object is moving faster than the imaging device when the first linear speed is less than the second linear speed (see, e.g., FIG. 21 (Part C)), or that the target object is moving slower than the imaging device when the first linear speed is greater than the second linear speed (see, e.g., FIG. 21 (Part B)).

In some other embodiments, the image analyzer may be configured to determine that the target object is moving in a different direction from the imaging device and at a substantially same speed as the imaging device, when the first linear direction is different from the second linear direction and when the first linear speed is substantially the same as the second linear speed (see, e.g., FIG. 22 (Part A)). In those embodiments, the image analyzer may be capable of determining whether the first linear direction is oblique to the second linear direction.

In some further embodiments, the image analyzer may be configured to determine that the target object is moving in a different direction from the imaging device and at a different speed from the imaging device, when the first linear direction is different from the second linear direction and when the first linear speed is different from the second linear speed (see, e.g., FIG. 22 (Parts B and C)). In those embodiments, the image analyzer may be capable of determining whether the first linear direction is oblique to the second linear direction. The image analyzer may be further configured to determine that the target object is moving faster than the imaging device when the first linear speed is less than the second linear speed (see, e.g., FIG. 22 (Part C)), or that the target object is moving slower than the imaging device when the first linear speed is greater than the second linear speed (see, e.g., FIG. 22 (Part B)).

In some embodiments, the first movement characteristic of the first set of pixels (associated with the background feature) may further comprise a first curvilinear velocity comprising a first curvilinear direction and a first curvilinear speed. The second movement characteristic of the second set of pixels (associated with the target feature) may comprise a second curvilinear velocity comprising a second curvilinear direction and a second curvilinear speed. In some embodiments, the image analyzer may be configured to determine that the target object and the imaging device are moving in the same curvilinear direction and at the same curvilinear speed (see, e.g., FIG. 25 (Part A)).

In some embodiments, the image analyzer may be configured to determine that the target object and the imaging device are moving in the same curvilinear direction and at different curvilinear speeds (see, e.g., FIG. 25 (Parts B and C)). In those embodiments, the image analyzer may be configured to determine that the target object is moving faster than the imaging device when the first curvilinear speed is less than the second curvilinear speed (see, e.g., FIG. 25 (Part C)), or that the target object is moving slower than the imaging device when the first curvilinear speed is greater than the second curvilinear speed (see, e.g., FIG. 25 (Part B)).

In some embodiments, the imaging device may move in a linear direction and the target object may move in a curvilinear direction (see, e.g., FIG. 24). In some other embodiments, the imaging device may move in a curvilinear direction and the target object may move in a linear direction. In some further embodiments, the imaging device and the target object may move in both linear and/or curvilinear directions at different times. Any motion of the imaging device and the target object (linear, non-linear, curvilinear, zig-zag, random patterns, etc.) may be contemplated.

In some embodiments, the acceleration of each pixel further comprises a linear acceleration and/or an angular acceleration of each pixel. For example, the first movement characteristic of the first set of pixels (associated with the background feature) may comprise a first linear acceleration and/or a first angular acceleration. The second movement characteristic of the second set of pixels (associated with the target feature) may comprise a second linear acceleration and/or a second angular acceleration.

The image analyzer may be configured to determine that the target object is accelerating relative to the background object and the imaging device when the first linear acceleration is different from the second linear acceleration. For example, the image analyzer can determine that the target object is accelerating faster than the imaging device when the first linear acceleration is less than the second linear acceleration, or that the target object is accelerating slower than the imaging device when the first linear acceleration is greater than the second linear acceleration.

Likewise, the image analyzer may be configured to determine that the target object is accelerating relative to the background object and the imaging device when the first angular acceleration is different from the second angular acceleration. For example, the image analyzer can determine that the target object is accelerating faster than the imaging device when the first angular acceleration is less than the second angular acceleration, or that the target object is accelerating slower than the imaging device when the first angular acceleration is greater than the second angular acceleration.

Figure 26:
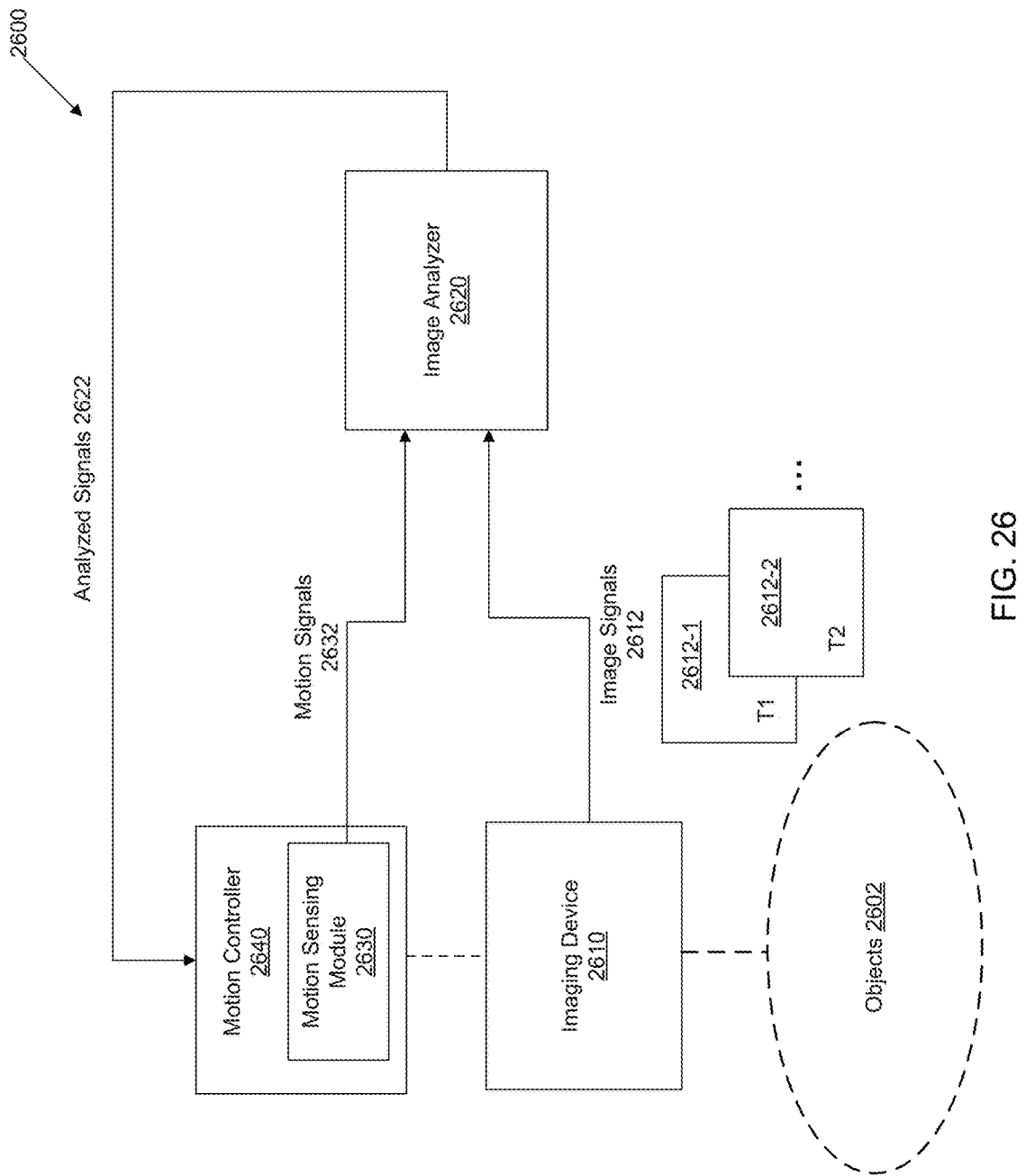
FIG. 26 illustrates a visual tracking system configured to track a group of feature points by adjusting motion characteristics of a mobile visual tracking device, in accordance with some embodiments.

FIG. 26 illustrates a visual tracking system 2600 for tracking a group of feature points by adjusting motion characteristics of a mobile visual tracking device, in accordance with some embodiments. In the embodiment of FIG. 26, the system may include a feedback loop for analyzed signals 2622 that are output from image analyzer 2620. The analyzed signals may be provided back to a motion controller 2640 comprising a motion sensing module 2630. In some embodiments, the motion controller and the motion sensing module may be provided on different components or devices. The motion controller may be configured to track a group of feature points by adjusting motion characteristics of a mobile visual tracking device. The imaging device may be mounted or supported on the mobile visual tracking device. The mobile visual tracking device may be a UAV. The motion sensing module may be configured to sense motion of the imaging device and/or the mobile visual tracking device, and provide motion signals 2632 to the image analyzer. The motion signals may include motion characteristics of the imaging device and/or the mobile visual tracking device.

The image analyzer may be configured to obtain movement characteristics of a plurality of feature points, based on image signals 2612 provided by the imaging device and the motion signals provided by the motion sensing module. The image analyzer may be further configured to select a group of feature points from the plurality of feature points based on the movement characteristics of the plurality of feature points. Movement information associated with the group of feature points may be provided back to the motion controller via the analyzed signals. The motion controller may be configured to track the group of feature points by adjusting motion characteristics of the mobile visual tracking device/imaging device, so as to substantially position the group of feature points in a target region of each image frame captured using the imaging device.

In the example of FIG. 26, the image analyzer may be configured to support visual tracking of one or more target objects. For example, the image analyzer may be configured to receive the plurality of image signals from the imaging device. The image signals may be indicative of a plurality of image frames (e.g. a first image frame 2612-1 and a second image frame 2612-2) captured by the imaging device over a period of time (e.g., at times T1 and T2, respectively) while the mobile visual tracking device/imaging device is in motion. Each image frame may comprise a plurality of pixels. The image analyzer may be further configured to obtain the motion characteristics of the mobile visual tracking device based on the plurality of motion signals, and to analyze the plurality of image signals based on the motion characteristics of the mobile visual tracking device, so as to compute movement characteristics associated with the plurality of pixels. The selective tracking of a group of feature points can be implemented using an optical flow algorithm, and will be described in further detail with reference to FIG. 27. Specifically, FIG. 27 illustrates the tracking of a group of feature points in exemplary images using the mobile visual tracking system of FIG. 26, in accordance with some embodiments.

Figure 27:
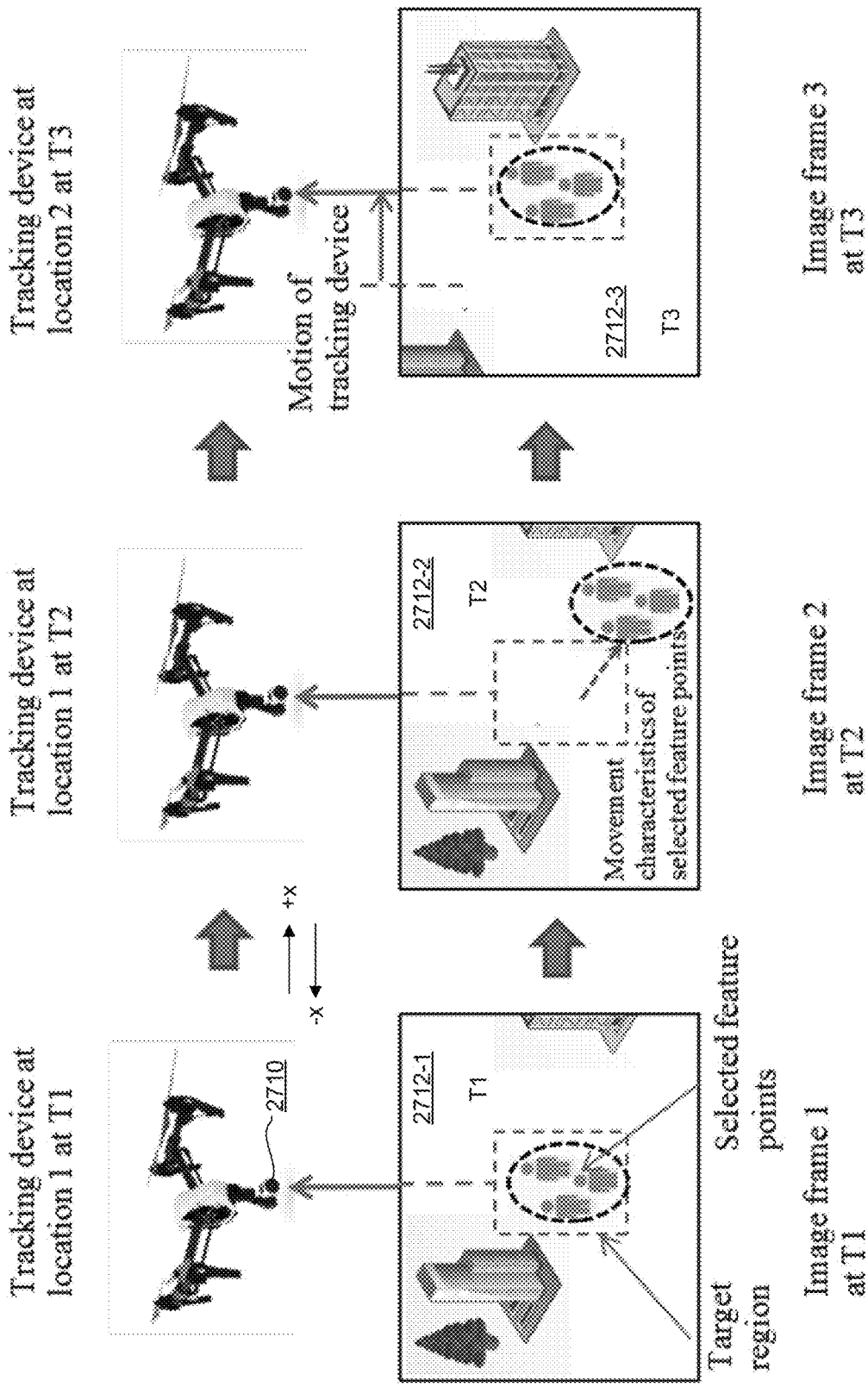
FIG. 27 illustrates the tracking of a group of feature points in a sequence of exemplary image frames using the mobile visual tracking system of FIG. 26, in accordance with some embodiments.

Referring to FIG. 27, an image analyzer (e.g., image analyzer 2620 of FIG. 26) may receive a plurality of image signals from an imaging device 2710. The imaging device may be mounted on a UAV. The image signals may comprise a first image frame 2712-1 captured at time T1 at location 1 and a second image frame 2712-2 captured at time T2 at location 1, whereby time T2 may be a point in time occurring after time T1. At time T1, a selected group of feature points (e.g., tracking feature associated with a plurality of target objects) may be positioned within a target region (dotted rectangular box) of the first image frame. At time T2, the selected group of feature points may have moved outside of the target region of the second image frame. In the example of FIG. 27, the target region may be a central region of each image frame. In other embodiments, the target region may be an edge region of each image frame. In some embodiments, a size of the target feature in the image frames can be adjusted by causing the imaging device to zoom in closer to the target objects, or to zoom further away from the target objects. In some embodiments, each image frame may comprise a plurality of target regions located at different locations or overlapping with one another.

Although FIG. 27 depicts three image frames, any number of images frames may be contemplated. For example, in some embodiments, the image signals may comprise a plurality of image frames 2712-1 to 2712-n captured over a period of time starting from T1 to Tn at respective locations 1 to m, where m and n may be any integer greater than 1.

In some embodiments, a greater number of image frames may be captured when the target object and/or the imaging device are moving quickly, and a fewer number of image frames may be captured when the target object and/or the imaging device are moving slowly.

Each image frame may comprise a plurality of pixels that are associated with a plurality of feature points. As shown in FIG. 27, the feature points may be associated with target objects (e.g., a group of people) and background objects (e.g., buildings, trees, golf course, gas station, etc.). In the example of FIG. 27, the target objects may be located at a first position at time T1 (see first image frame 2712-1) and moved to a second position at time T2 (see second image frame 2712-2).

In the example of FIG. 27, movement information associated with the group of feature points may be provided back to the motion controller via the analyzed signals. The motion controller may be configured to track the group of feature points by adjusting motion characteristics of the mobile visual tracking device (e.g., by moving the tracking device from location 1 to location 2), so as to substantially position the group of feature points in each target region. Accordingly, the group of feature points may be substantially positioned in the target region of a third image frame 2712-3 captured at time T3 at location 2.

The motion characteristics of the mobile visual tracking device may be adjusted such that the motion characteristics of the mobile visual tracking device are substantially the same as the movement characteristics of the group of feature points. The movement characteristics of the group of feature points may comprise at least a velocity and/or an acceleration of the group of feature points. The velocity of the mobile visual tracking device may be associated with the velocity of the group of feature points. Likewise, the acceleration of the mobile visual tracking device may be associated with the acceleration of the group of feature points. Accordingly, the motion controller can adjust the velocity and/or acceleration of the mobile visual tracking device to track the group of feature points, so as to substantially position the group of feature points in each target region.

In some embodiments, when the mobile visual tracking device is carried by a movable apparatus such as a UAV, a movement characteristic of the UAV may be adjusted so as to allow the mobile visual tracking device to track the group of feature points. In some embodiments, the mobile visual tracking device may comprise an imaging device. In some embodiments, the motion controller may be configured to adjust the movement of the imaging device relative to the movement of the UAV to track the group of feature points. In some embodiments, the imaging device may be supported by a movable apparatus. The movable apparatus may be an unmanned aerial vehicle (UAV). The movable apparatus may comprise a carrier for the imaging device that permits the imaging device to move relative to a supporting structure on the movable apparatus. In some embodiments, the group of feature points may be positioned at all times in a field-of-view of the imaging device.

As previously described, the motion controller may be configured to track the group of feature points by adjusting motion characteristics of the mobile visual tracking device/imaging device, so as to substantially position the group of feature points in a target region of each image frame captured using the imaging device. The motion characteristics of the mobile visual tracking device/imaging device may be adjusted via translational movement of the device, rotational movement of the device, curvilinear motion of the device, changing orientation (e.g., attitude, pitch, roll, yaw) of the device, zoom-in or zoom-out (magnification) of the device, or any combination of the above. In some embodiments, the motion characteristics of the mobile visual tracking device/imaging device may be adjusted based on certain preferential parameters (e.g., the device staying within a predetermined distance to the target objects, or keeping a minimum distance away from the target objects).

In some embodiments, the mobile visual tracking device may be configured to track a group of feature points so long as the group of feature points have substantially a same movement characteristic. For example, the group of feature points may be generally moving in a same direction. The mobile visual tracking device may be configured to track the group of feature points independent of a size and/or a shape of the group of feature points.

Figure 28:
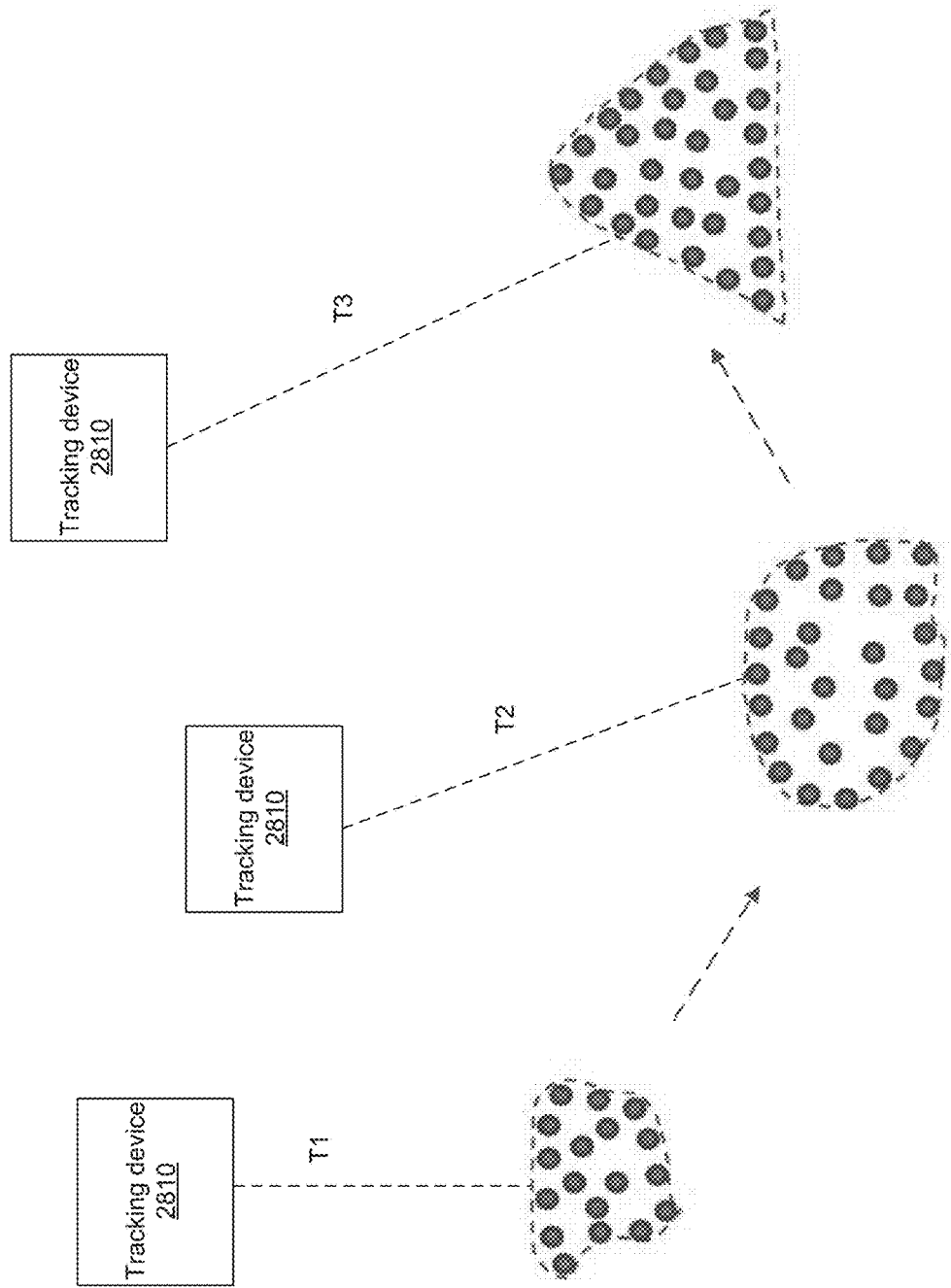
FIG. 28 illustrates the tracking of a constantly changing group of feature points in a sequence of exemplary image frames using the mobile visual tracking system of FIG. 26, in accordance with some embodiments.

In the embodiment of FIG. 27, the mobile visual tracking device is shown tracking a group of feature points surrounded by a contour having substantially the same shape and size, as the target objects move from one location to another location. In some embodiments, the mobile visual tracking device can track a group of feature points surrounded by a contour having an amorphous shape and/or changing size, for example as shown in FIG. 28. In the embodiment of FIG. 28, the size and/or shape of the contour surrounding the group of feature points changes over time as the number of target objects changes, or when the target objects move collectively in a random manner. For example, the size and/or shape of the contour may be different as the target objects move between different locations at times T1, T2, and T3. The motion controller can adjust the motion characteristics of the mobile visual tracking device to track the constantly changing group of feature points, so as to substantially position the group of feature points in each target region.

In some embodiments, the group of feature points may comprise a plurality of subsets of feature points. The plurality of subsets of feature points may comprise a first subset and a second subset of feature points. The first and second subsets of feature points may have substantially the same movement characteristic. The mobile visual tracking device may be configured to track the first and second subsets of feature points having substantially the same movement characteristic, as illustrated in FIG. 29 (Part A).

In some alternative embodiments, the first and second subsets of feature points may have substantially different movement characteristics. In those embodiments, the mobile visual tracking device may be configured to track at least one of the first or the second subsets of feature points. For example, in some instances, the mobile visual tracking device may be configured to track the first subset of feature points when a size of the first subset of feature points is greater than a size of the second subset of feature points, as illustrated in FIG. 29 (Part B). In other instances, the mobile visual tracking device may be configured to track the first subset of feature points when a size of the first subset of feature points is smaller than a size of the second subset of feature points. The mobile visual tracking device may track any particular subset of feature points depending on various characteristics associated with that subset of feature points. Exemplary characteristics may include size (as described above), shape, movement characteristics, etc. The movement characteristics may include speed, acceleration, or orientation of the feature points. In some embodiments, the subset of feature points may be tracked based on multifactor weighting (e.g., based on a plurality of different factors relating size, shape, speed, orientation, etc.). In some embodiments, the tracking device may be configured to track the feature points for as long as possible (for example, by zooming out to increase the field-of-view if the feature points begin to diverge), and to select one or more of the subsets of feature points if all of the feature points cannot be substantially tracked with sufficient clarity/detail. In some embodiments, when the feature points start to diverge, the imaging device may move to a higher vertical location relative to the target objects, or a further lateral distance away from the target objects, so that the tracking feature can be positioned in the field-of-view of the imaging device or in a target region of the image frames captured by the imaging device.

In some embodiments, sensors and/or processors may be coupled with movable objects. Movable objects may be an unmanned movable object, such as an unmanned aerial vehicle. In some embodiments, the sensors may comprise imaging devices such as cameras. One or more imaging devices may be carried by a UAV. Any description herein of UAVs may apply to any other type of movable objects as desired. In some embodiments, the processor may be an embedded processor carried by the UAV. Alternatively, the processor may be separated from the UAV (e.g., at a ground station, communicating with the UAV or a movable remote controller communicating with the UAV). The UAV may utilize the imaging devices as described herein to carry out operations (e.g., in the context of visual tracking). For example, the processors on the UAV may analyze the images captured by the imaging devices and use them to identify and/or track target objects. The UAV may utilize computer vision to self-navigate within an environment. Self-navigation may include determining a local or global location of the UAV, orientation of the UAV, detection and avoidance of obstacles, and the like. Imaging devices of the present disclosure can be situated on any suitable portion of the UAV, such as above, underneath, on the side(s) of, or within a vehicle body of the UAV. Some imaging devices can be mechanically coupled to the UAV such that the spatial disposition and/or motion of the UAV correspond to the spatial disposition and/or motion of the imaging device. The imaging devices can be coupled to the UAV via a rigid coupling, such that the imaging device does not move relative to the portion of the UAV to which it is attached. Alternatively, the coupling between the imaging device and the UAV can permit movement (e.g., translational or rotational movement relative to the UAV) of the imaging device relative to the UAV. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the UAV. Furthermore, the imaging device can be electrically coupled with a portion of the UAV (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage). One or more imaging devices may be situated on the UAV. For example, 1, 2, 3, 4, 5 or more imaging devices may be situated on the UAV. The one or more imaging devices may have the same field-of-view (FOV) or a different FOV. Each of the one or more imaging devices may be coupled to one or more processors. Each of the one or more imaging devices may individually or collectively perform the methods mentioned herein. The one or more imaging devices may capture images each with a desired texture quality. Each imaging device may capture images what are utilized for the same or different function (e.g., visual tracking application).

For example, a UAV may be coupled with two imaging devices, one which tracks a group of target objects, and another that captures images that are utilized for navigation or self-positioning.

As previously described, the imaging device can be mounted on a tracking device. The tracking device may be a UAV. In some instances, the tracking device may be implemented on or provided in a UAV. Any description herein of a UAV may apply to any other type of aerial vehicle, or any other type of movable object, and vice versa. The tracking device may be capable of self-propelled motion. The description of a UAV may apply to any type of unmanned movable object (e.g., which may traverse the air, land, water, or space). The UAV may be capable of responding to commands from a remote controller. The remote controller need not be physically connected to the UAV, and may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV may have a housing. The housing may include one or more internal cavities. The UAV may include a central body. The UAV may optionally have one or more arms branching from the central body. The arms may support the propulsion units. One or more branch cavities may be within the arms of the UAV. The housing may or may not include the arms that branch from the central body. In some instances, the housing may be formed from an integral piece that encompasses the central body and the arms. Alternatively, separate housings or pieces are used to form the central body and arms.

Optionally, the tracking device may be movable by changing spatial location (e.g., translating in an X direction, Y direction, and/or Z direction). Alternatively or in combination, the tracking device may be configured to change orientation within space. For instance, the tracking device may be capable of rotating about a yaw axis, a pitch axis, and/or a roll axis. In one example, the tracking device may not substantially change spatial location, but may change angular orientation (e.g., a security camera mounted on a stationary support, such as a structure). In another example, the tracking device may not substantially change orientation but may change spatial location. In some instances, the tracking device may be capable of both changing spatial location and angular orientation.

Figure 30:
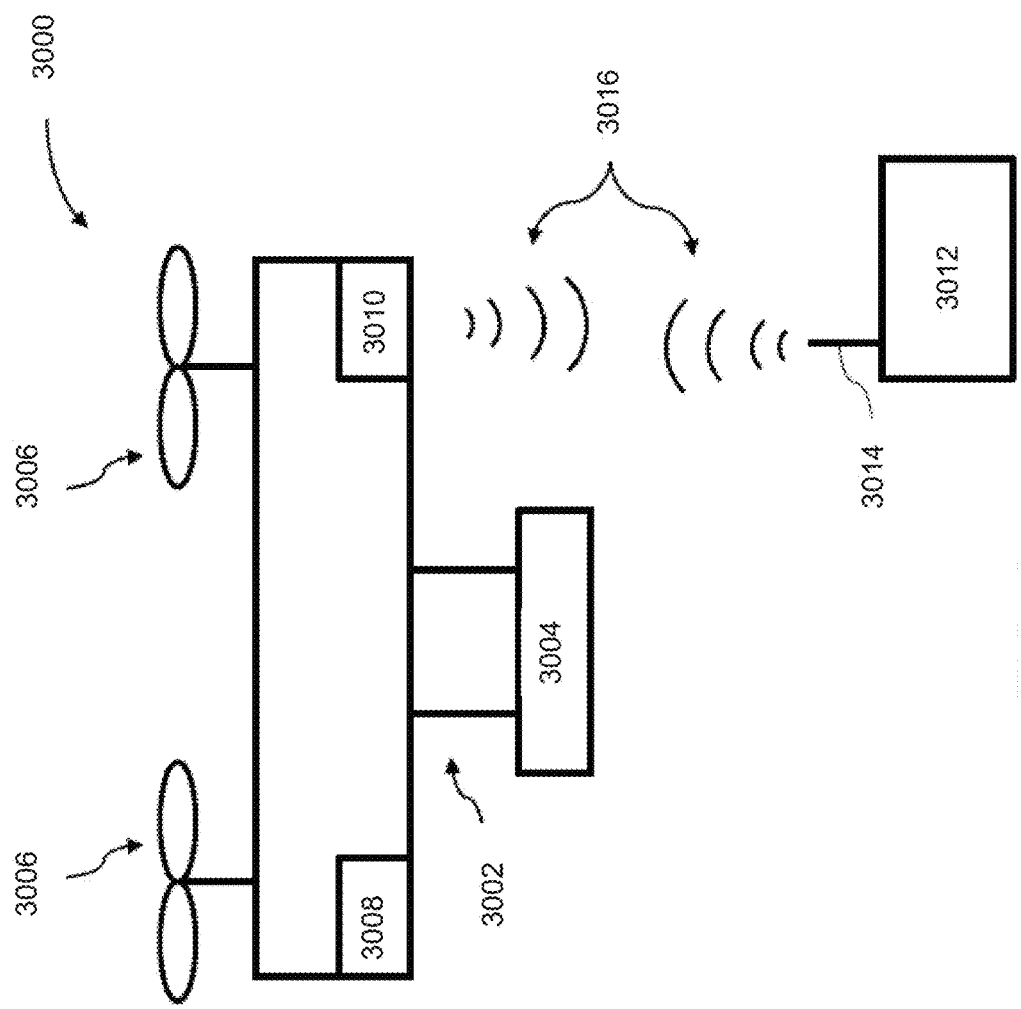
FIG. 30 is a schematic block diagram of a system for controlling a movable object, in accordance with some embodiments.

FIG. 30 illustrates a movable object 3000 including a carrier 3002 and a payload 3004, in accordance with embodiments. Although the movable object 3000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some embodiments, the movable object 3000 may be a UAV. The UAV can include a propulsion system any number of rotors (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 7 m, from 70 cm to 2 m, or from 5 cm to 5 m. Any description herein of a UAV may apply to a movable object, such as a movable object of a different type, and vice versa.

In some instances, the payload 3004 may be provided on the movable object 3000 without requiring the carrier 3002. The movable object 3000 may include propulsion mechanisms 3006, a sensing system 3008, and a communication system 3010. The propulsion mechanisms 3006 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 3006 can enable the movable object 3000 to take off vertically from a surface or land vertically on a surface without requiring any horizontal movement of the movable object 3000 (e.g., without traveling down a runway). Optionally, the propulsion mechanisms 3006 can be operable to permit the movable object 3000 to hover in the air at a specified position and/or orientation.

For example, the movable object 3000 can have multiple horizontally oriented rotors that can provide lift and/or thrust to the movable object. The multiple horizontally oriented rotors can be actuated to provide vertical takeoff, vertical landing, and hovering capabilities to the movable object 3000. In some embodiments, one or more of the horizontally oriented rotors may spin in a clockwise direction, while one or more of the horizontally rotors may spin in a counter-clockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 3000 (e.g., with respect to up to three degrees of translation and up to three degrees of rotation).

The sensing system 3008 can include one or more sensors that may sense the spatial disposition, velocity, and/or acceleration of the movable object 3000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 3008 can be used to control the spatial disposition, velocity, and/or orientation of the movable object 3000 (e.g., using a suitable processing unit and/or control module, as described below). Alternatively, the sensing system 3008 can be used to provide data regarding the environment surrounding the movable object, such as weather conditions, proximity to potential obstacles, location of geographical features, location of manmade structures, and the like.

The sensing system may include image sensors, imaging devices, and/or image analyzers (e.g., image analyzer 120 of FIG. 1) as described herein. The sensing system may also include a motion sensing module (e.g., motion sensing module 1530 of FIG. 15) as described herein. The sensing system may further include a motion controller (e.g., motion controller 2640 of FIG. 26) as described herein. The motion sensing module may be configured to sense motion of the imaging device and/or a mobile visual tracking device, and provide motion signals to the image analyzer. The motion signals may include motion characteristics of the imaging device and/or the mobile visual tracking device. The image analyzer may be configured to obtain movement characteristics of a plurality of feature points, based on image signals provided by the imaging device and the motion signals provided by the motion sensing module. The image analyzer may be further configured to select a group of feature points from the plurality of feature points based on the movement characteristics of the plurality of feature points.

Movement information associated with the group of feature points may be provided back to the motion controller via the analyzed signals. The motion controller may be configured to track the group of feature points by adjusting motion characteristics of the mobile visual tracking device/imaging device, so as to substantially position the group of feature points in a target region of each image frame captured using the imaging device. The motion controller may be configured to track a group of feature points by adjusting motion characteristics of a mobile visual tracking device.

Accordingly, one or more of the components in the above sensing system can enable precise tracking of a moving target object and/or a group of moving target objects under different conditions. The conditions may include both indoor and outdoor environments, places without GPS signals or places that have poor GPS signal reception, a variety of different terrain, etc. The target objects may include target objects that do not carry GPS apparatus, target objects that do not have well-defined features or that do not fall into known object classes, target objects that collectively form a group whereby the size and/or shape of the group may be amorphous and change over time, a plurality of different target objects moving in different formations, or any combination of the above.

The communication system 3010 enables communication with terminal 3012 having a communication system 3014 via wireless signals 3016. In some embodiments, the terminal may include an image analyzer, a motion sensing module, and/or a motion controller as described elsewhere herein. The communication systems 3010, 3014 may include any number of transmitters, receivers, and/or transceivers suitable for wireless communication. The communication may be one-way communication, such that data can be transmitted in only one direction. For example, one-way communication may involve only the movable object 3000 transmitting data to the terminal 3012, or vice-versa. The data may be transmitted from one or more transmitters of the communication system 3010 to one or more receivers of the communication system 3012, or vice-versa. Alternatively, the communication may be two-way communication, such that data can be transmitted in both directions between the movable object 3000 and the terminal 3012. The two-way communication can involve transmitting data from one or more transmitters of the communication system 3010 to one or more receivers of the communication system 3014, and vice-versa.

In some embodiments, the terminal 3012 can provide control data to one or more of the movable object 3000, carrier 3002, and payload 3004 and receive information from one or more of the movable object 3000, carrier 3002, and payload 3004 (e.g., position and/or motion information of the movable object, carrier or payload; data sensed by the payload such as image data captured by a payload camera). In some embodiments, the movable object 3000 can be configured to communicate with another remote device in addition to the terminal 3012, or instead of the terminal 3012. The terminal 3012 may also be configured to communicate with another remote device as well as the movable object 3000. For example, the movable object 3000 and/or terminal 3012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 3000, receive data from the movable object 3000, transmit data to the terminal 3012, and/or receive data from the terminal 3012. Optionally, the remote device can be connected to the Internet or other telecommunications network, such that data received from the movable object 3000 and/or terminal 3012 can be uploaded to a website or server.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for supporting visual tracking, the method comprising:
obtaining, via a mobile visual tracking device, movement characteristics of a plurality of feature points;

selecting a group of feature points from the plurality of feature points based on the movement characteristics of the plurality of feature points; and tracking the group of feature points by adjusting motion characteristics of the mobile visual tracking device, so as to position the group of feature points in a target region of each image frame captured using the mobile visual tracking device, wherein the mobile visual tracking device is configured to track the group of feature points so long as the group of feature points share a same movement characteristic.

2. The method of claim 1, wherein the target region is a central region of each image frame.

3. The method of claim 1, wherein the target region is an edge region of each image frame.

4. The method of claim 1, wherein the motion characteristics of the mobile visual tracking device are adjusted such that the motion characteristics of the mobile visual tracking device are the same as the movement characteristics of the group of feature points.

5. The method of claim 4, wherein the movement characteristics of the group of feature points comprise at least a velocity and/or an acceleration of the group of feature points.

6. The method of claim 5, wherein the velocity of the mobile visual tracking device is substantially the same as the velocity of the group of feature points.

7. The method of claim 5, wherein the acceleration of the mobile visual tracking device is the same as the acceleration of the group of feature points.

8. The method of claim 1, wherein, when the mobile visual tracking device is carried by a movable apparatus, a movement characteristic of the movable apparatus is adjusted so as to allow the mobile visual tracking device to track the group of feature points.

9. The method of claim 8, wherein the mobile visual tracking device comprises an imaging device, and the method further comprising: adjusting the movement of the imaging device relative to the movement of the UAV to track the group of feature points.

10. The method of claim 1, wherein the mobile visual tracking device is configured to track the group of feature points independent of a size and/or a shape of the group of feature points.

11. The method of claim 1,
wherein the group of feature points is a first subset of feature points;
the method further comprising:
selecting a second subset of feature points from the plurality of feature points based on the movement characteristics of the plurality of feature points.

12. The method of claim 11, wherein the first and second subsets of feature points have the same movement characteristic.

13. The method of claim 12, wherein the mobile visual tracking device is configured to track the first and second subsets of feature points having the same movement characteristic.

14. The method of claim 11, wherein the first and second subsets of feature points have different movement characteristics.

15. The method of claim 14, wherein the mobile visual tracking device is configured to track one of the first or the second subsets of feature points.

16. The method of claim 14, wherein the mobile visual tracking device is configured to track the first subset of feature points when a size of the first subset of feature points is greater than a size of the second subset of feature points.

17. An apparatus for supporting visual tracking, the apparatus comprising one or more processors that are, individually or collectively, configured to:

obtain, via a mobile visual tracking device, movement characteristics of a plurality of feature points;

select a group of feature points from the plurality of feature points based on the movement characteristics of the plurality of feature points; and track the group of feature points by adjusting motion characteristics of the mobile visual tracking device, so as to position the group of feature points in a target region of each image frame captured using the mobile visual tracking device, wherein the mobile visual tracking device is configured to track the group of feature points so long as the group of feature points share a same movement characteristic.

18. An unmanned aerial vehicle (UAV) comprising:
a visual tracking system comprising:
an imaging device; and
one or more processors that are, individually or collectively, configured to:

obtain, via a mobile visual tracking device, movement characteristics of a plurality of feature points;

select a group of feature points from the plurality of feature points based on the movement characteristics of the plurality of feature points; and track the group of feature points by adjusting motion characteristics of the mobile visual tracking device, so as to position the group of feature points in a target region of each image frame captured using the mobile visual tracking device, wherein the mobile visual tracking device is configured to track the group of feature points so long as the group of feature points share a same movement characteristic.

* * * * *